(12) United States Patent
Nishidono et al.

(10) Patent No.: US 10,344,729 B2
(45) Date of Patent: Jul. 9, 2019

(54) ENGINE INCLUDING DIRECT INJECTOR AND PORT INJECTOR

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Takehiro Nishidono, Tokyo (JP); Junji Takai, Okazaki (JP); Toshio Yokoyama, Okazaki (JP)

(73) Assignees: MITSUBISHI KOGYO KABUSHIKI KAISHA, Tokyo (JP); MITSUBISHI JIDOSHA ENGINEERING KABUSHIKI KAISHA, Okazaki-Shi, Aichi (JP)

( * ) Notice: Subject to any disclaimer, the term of this patent is extended or adjusted under 35 U.S.C. 154(b) by 0 days.

(21) Appl. No.: 15/595,042

(22) Filed: May 15, 2017

(65) Prior Publication Data

US 2017/0248103 A1 Aug. 31, 2017

Related U.S. Application Data

(63) Continuation of application No. PCT/JP2014/084348, filed on Dec. 25, 2014.

(51) Int. Cl.
*F02M 69/04* (2006.01)
*F02M 35/116* (2006.01)
(Continued)

(52) U.S. Cl.
CPC .... *F02M 69/042* (2013.01); *F02M 35/10085* (2013.01); *F02M 35/10157* (2013.01);
(Continued)

(58) Field of Classification Search
CPC ...... F02M 61/14; F02M 61/145; F02M 35/10; F02M 35/10006; F02M 35/10091; F02M 35/10242
(Continued)

(56) References Cited

U.S. PATENT DOCUMENTS

| 4,932,368 A | 6/1990 | Abe et al. |
| 6,269,797 B1 * | 8/2001 | Uchida ............... F02F 1/108 |
| | | 123/468 |

(Continued)

FOREIGN PATENT DOCUMENTS

| EP | 1179676 A1 | 2/2002 |
| JP | 1-240765 A | 9/1989 |

(Continued)

OTHER PUBLICATIONS

Japanese Office Action dated Dec. 1, 2017 issued in corresponding Japanese Patent Application No. 2016-565766 with an English Translation.

(Continued)

*Primary Examiner* — Erick R Solis
*Assistant Examiner* — Robert A Werner
(74) *Attorney, Agent, or Firm* — Birch, Stewart, Kolasch & Birch, LLP

(57) ABSTRACT

A cylinder block including: a plurality of cylinders; a cylinder head attached on the cylinder block and including, for each of the cylinders, an intake port extending from a combustion chamber upward and obliquely relative to an axis of the cylinder; a direct injector disposed at a position on an outer side of the intake port in a cylinder radial direction and directly injecting fuel into the combustion chamber; a port injector disposed at a position on a same side as the direct injector relative to the intake port, and injecting fuel into the intake port are provided. The intake (Continued)

port includes: a valve seat provided at an intake air inlet opened to the combustion chamber; and an arc portion protruding downward in a center area of the intake port on an upstream side of the valve seat, and an injection direction of the port injector is orientated in a direction in which the fuel injected from the port injector passes through a lower area of the arc portion.

17 Claims, 12 Drawing Sheets

(51) Int. Cl.
| | |
|---|---|
| *F02M 63/00* | (2006.01) |
| *F02M 69/00* | (2006.01) |
| *F02M 35/10* | (2006.01) |
| *F02M 61/14* | (2006.01) |
| F02B 75/12 | (2006.01) |
| F02D 41/30 | (2006.01) |
| F02B 33/38 | (2006.01) |
| F02B 75/22 | (2006.01) |

(52) U.S. Cl.
CPC .............. *F02M 35/10177* (2013.01); *F02M 35/10216* (2013.01); *F02M 35/116* (2013.01); *F02M 61/145* (2013.01); *F02M 63/00* (2013.01); *F02M 69/00* (2013.01); *F02M 69/04* (2013.01); *F02M 69/046* (2013.01); *F02B 33/38* (2013.01); *F02B 75/22* (2013.01); *F02B 2075/125* (2013.01); *F02D 41/3094* (2013.01); *Y02T 10/123* (2013.01); *Y02T 10/144* (2013.01)

(58) Field of Classification Search
USPC .......................................................... 123/299
See application file for complete search history.

(56) References Cited

U.S. PATENT DOCUMENTS

| | | | | |
|---|---|---|---|---|
| 8,047,180 | B2* | 11/2011 | Sato | F02D 9/1095 |
| | | | | 123/336 |
| 2002/0014228 | A1* | 2/2002 | Yamada | F02B 17/005 |
| | | | | 123/559.1 |
| 2005/0235961 | A1* | 10/2005 | Kayama | F02M 35/10216 |
| | | | | 123/432 |
| 2006/0207527 | A1* | 9/2006 | Saeki | F02B 23/104 |
| | | | | 123/54.4 |
| 2006/0207555 | A1 | 9/2006 | Ito et al. | |
| 2009/0235890 | A1 | 9/2009 | Maeda | |
| 2016/0201593 | A1* | 7/2016 | Berkemeier | F02D 41/3094 |
| | | | | 123/299 |

FOREIGN PATENT DOCUMENTS

| | | |
|---|---|---|
| JP | 6-74777 B2 | 9/1994 |
| JP | 10-37752 A | 2/1998 |
| JP | 2002-48035 A | 2/2002 |
| JP | 3557314 B2 | 8/2004 |
| JP | 4495211 B2 | 6/2010 |
| WO | WO 2006/100943 A1 | 9/2006 |

OTHER PUBLICATIONS

Chinese Office Action and Search Report, dated Sep. 4, 2018, for Chinese Application No. 201480084063.8, along with an English translation.

* cited by examiner

ENGINE INCLUDING DIRECT INJECTOR AND PORT INJECTOR

CROSS REFERENCE TO RELATED APPLICATIONS

This application is a Continuation of PCT International Application No. PCT/JP2014/084348 filed on Dec. 25, 2014, which is hereby expressly incorporated by reference into the present application.

TECHNICAL FIELD

This invention relates to an engine including a direct injector and a port injector.

BACKGROUND

PTL 1 and PTL 2 disclose an engine including a direct injector and a port injector. The engine includes a cylinder block including a plurality of cylinders and a cylinder head attached on the cylinder block. The cylinder head includes for each of the cylinders, an intake port extending from a combustion chamber upward and obliquely relative to an axis of the cylinder. An intake manifold is connected to the cylinder head and has an intake air passage which is formed to be branched and communicates with the intake port.

The engine disclosed in PTL 1 has the direct injector on an outer side of the intake port in a cylinder radial direction, and has the port injector on an inner side of the intake manifold, on the opposite side of the direct injector relative to the intake port.

The engine disclosed in PTL 2 has the direct injector on the outer side of the intake port in the cylinder radial direction, and has the port injector on the outer side of the intake manifold, on the same side as the direct injector relative to the intake port, in the cylinder radial direction.

CITATION LIST

Patent Literature

Patent Document 1: Japanese Patent No. 4495211
Patent Document 2: Japanese Patent Application Laid-open No. 2002-48035

SUMMARY

Technical Problem

The engine disclosed in PTL 1 has the direct injector on the inner side of the intake port in a cylinder radial direction, and has the port injector on an inner side of the intake manifold, on the opposite side of the direct injector relative to the intake port. Thus, when a sufficient space cannot be formed on the inner side of the intake manifold in the cylinder radial direction, the port injector cannot be disposed without increasing the entire level of the engine.

The engine disclosed in PTL 2 has the port injector on the outer side of the intake manifold, on the same side as the direct injector relative to the intake port, in the cylinder radial direction. The intake port is formed to have a linear shape. Thus, the port injector needs to be provided at a position separated from the intake valve, or the fuel injected from the port injector is not sufficiently mixed with air flowing in the intake port.

In view of the above, an object of the present invention is to provide an engine in which a direct injector and a port injector can be efficiently arranged, and fuel injected from the port injector is favorably mixed with air.

Solution to Problem (1) An engine according to one embodiment of the present invention includes:
 a cylinder block including a plurality of cylinders;
 a cylinder head attached on the cylinder block and including, for each of the cylinders, an intake port extending from a combustion chamber upward and obliquely relative to an axis of the cylinder;
 a direct injector disposed at a position on an outer side of the intake port in a cylinder radial direction and directly injecting fuel into the combustion chamber;
 a port injector disposed at a position on a same side as the direct injector relative to the intake port, and injecting fuel into the intake port, wherein
 the intake port includes:
 a valve seat provided at an intake air inlet opened to the combustion chamber; and
 an arc portion protruding downward in a center area of the intake port on an upstream side of the valve seat, and
 an injection direction of the port injector is orientated in a direction in which the fuel injected from the port injector passes through a lower area of the arc portion.

In the configuration (1) described above, the intake port includes: a valve seat provided at an intake air inlet opened to the combustion chamber; and an arc portion protruding downward in a center area of the intake port on an upstream side of the valve seat, and an injection direction of the port injector is orientated in a direction in which the fuel injected from the port injector passes through a lower area of the arc portion. Thus, the direct injector and the port injector can be efficiently arranged, and fuel injected from the port injector is favorably mixed with air.

(2) In some embodiments, in the configuration (1) described above, an angle between the injection direction of the port injector and a lower surface of the cylinder head is larger than an angle between a straight line, which passes through an injection position of the port injector and contacts a lower most surface of the arc portion, and the lower surface of the cylinder head.

In the configuration (2) described above, the fuel injected from the port injector passes through a lower area of the arc portion, and thus can be suppressed from attaching to the arc portion.

(3) In some embodiments, in the configuration (1) or (2) described above, the intake port is bifurcated on a downstream side of the port injector.

In the configuration (3) described above, the direct injector can be disposed in a lower area of the bifurcated intake port and thus can be efficiently arranged.

(4) In some embodiments, in any one of the configurations (1) to (3) described above, the center axes of the direct injector and the port injector are disposed on a same plane passing through the axis of the cylinders.

In the configuration (4) described above, the fuel injected from the port injector can be evenly distributed between both sides of a plane passing through the center of the direct injector.

(5) In some embodiments, in the configuration (4) described above, the center axes of the direct injector and the port injector are in parallel with each other or cross each other on a front side in a fuel injection direction.

In the configuration (5) described above, the fuel injected from the direct injector spreads against a tumble flow generated in the cylinder. Thus, the mixing of the fuel and the air in the cylinder is facilitated.

(6) In some embodiments, in the configuration (4) or (5) described above, an angle between the center axis of the port injector and the lower surface of the cylinder head is equal to or larger than an angle between the center axis of the direct injector and the lower surface of the cylinder head.

In the configuration (6) described above, the fuel injected from the port injector can be suppressed from attaching to the inner wall surface of the intake port, and the fuel injected from the direct injector can be suppressed from attaching to the inner wall surface of the cylinder.

(7) In some embodiments, in any one of the configurations (4) to (6) described above, the plane passing through the axis of the cylinder is orthogonal to an arrangement direction of the cylinders.

In the configuration (7) described above, the direct injector and the port injector are arranged to be orthogonal to the arrangement direction of the cylinders. Thus, a high pressure delivery pipe for supplying fuel to the direct injector can be arranged in the arrangement direction of the cylinders, and a low pressure delivery pipe for supplying fuel to the port injector can be arranged in the arrangement direction of the cylinders.

(8) In some embodiments, any one of the configurations (1) to (7) described above further includes an intake manifold connected to the cylinder head and having an intake air passage, which is formed to be branched and communicates with the intake port, and the port injector is fixed to the intake manifold.

In the configuration (8) described above, the intake manifold can be fixed to the cylinder head in a state where the port injector is fixed to the intake manifold.

(9) In some embodiments, in the configuration (8) described above, the intake port is opened to a flat surface extending in a horizontal direction on an upper surface of the cylinder head, the intake manifold includes a joining surface which is joined to the flat surface of the cylinder head and through which the intake air passage passes, and the port injector has a nozzle portion protruding toward the intake port beyond the joining surface.

In the configuration (9) described above, the thickness of the port injector attachment seat can be reduced compared with a case where the nozzle portion of the port injector is positioned closer to the intake manifold than the joining surface.

(10) In some embodiments, in any one of the configurations (1) to (9) described above, the port injector has an injection axis oriented to an umbrella center of an intake valve closing the intake port.

In the configuration (10) described above, the fuel injected from the port injector flows toward a center of a bell-shape of the intake valve, and thus can be suppressed from attaching to the inner wall surface of the intake port.

(11) In some embodiments, in any one of the configurations (1) to (10) described above, the cylinder block has a V shape formed by the plurality of cylinders alternately arranged on left and right sides, and the direct injector and the port injector are disposed on an inner side of a bank of the cylinder block.

In the configuration (11) described above, the direct injector and the port injector can be provided on the inner side of the bank of the cylinder block in a concentrated manner.

(12) In some embodiments, in the configuration (11) described above, the port injector is disposed at a position where the intake port is most protruded toward the inner side of the bank of the cylinder block.

In the configuration (12) described above, the port injector can be efficiently arranged on the inner side of the bank.

Advantageous Effects

In at least one embodiment of the present invention, the direct injector and the port injector can be efficiently arranged, and the fuel injected from the port injector is favorably mixed with air flowing in the intake port.

DETAILED DESCRIPTION

Embodiments of the present invention will now be described in detail with reference to the accompanying drawings. It is intended, however, that unless particularly specified, dimensions, materials, shapes, relative positions, and the like of components described in the embodiments or illustrated in the accompanying drawings shall be interpreted as illustrative only and not limitative of the scope of the present invention.

The expressions used herein that mean relative or absolute arrangement, such as "in a direction", "along a direction", "in parallel with", "orthogonal to", "center", "concentrically", and "coaxial" mean not only exactly what they refer to but also such states that are relatively displaced with a tolerance or by an angle or distance that is small enough to achieve the same level of functionality.

For example, expressions that represent shapes, such as quadrangles and cylindrical shapes, mean not only what they refer to in a geometrically strict sense but also represent shapes including irregularities, chamfers, or the like that can exhibit the same level of effects.

The expressions "including", "comprising", "provided with", "containing" and "having" one component are not exclusive expressions that exclude other components.

Directions of an engine described in the present embodiment is based on a driver's seat of an automobile with the engine installed in a vehicle body front portion. Thus, a figure based on a crankshaft direction front surface has left and right reversed, meaning that the left and right sides in the figure are respectively referred to as right and left sides.

Figure 1:
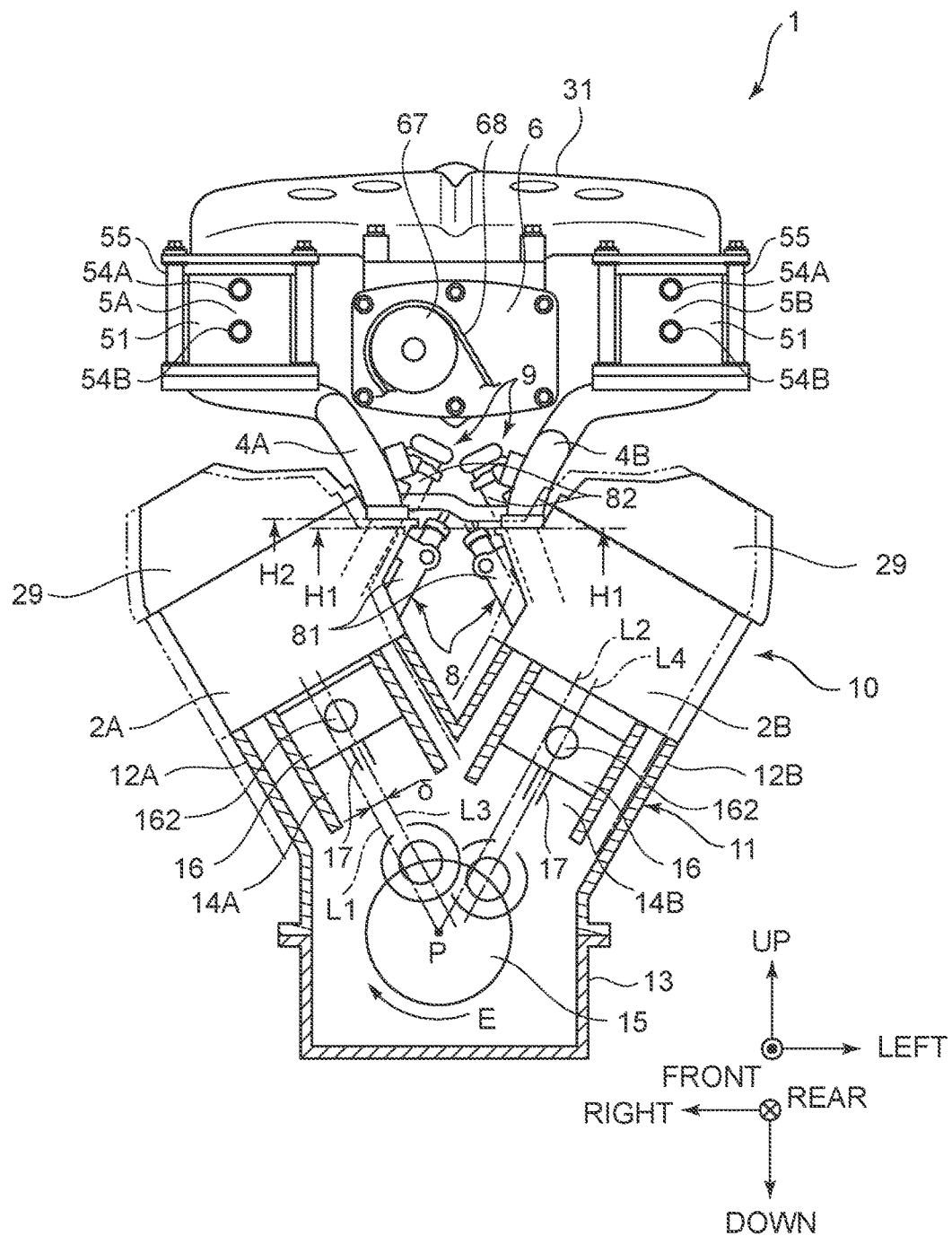
FIG. 1 is a front view illustrating an overall configuration of a V engine according to an embodiment as viewed from a crankshaft direction front surface, and is a partial cross-sectional view.
Figure 2:
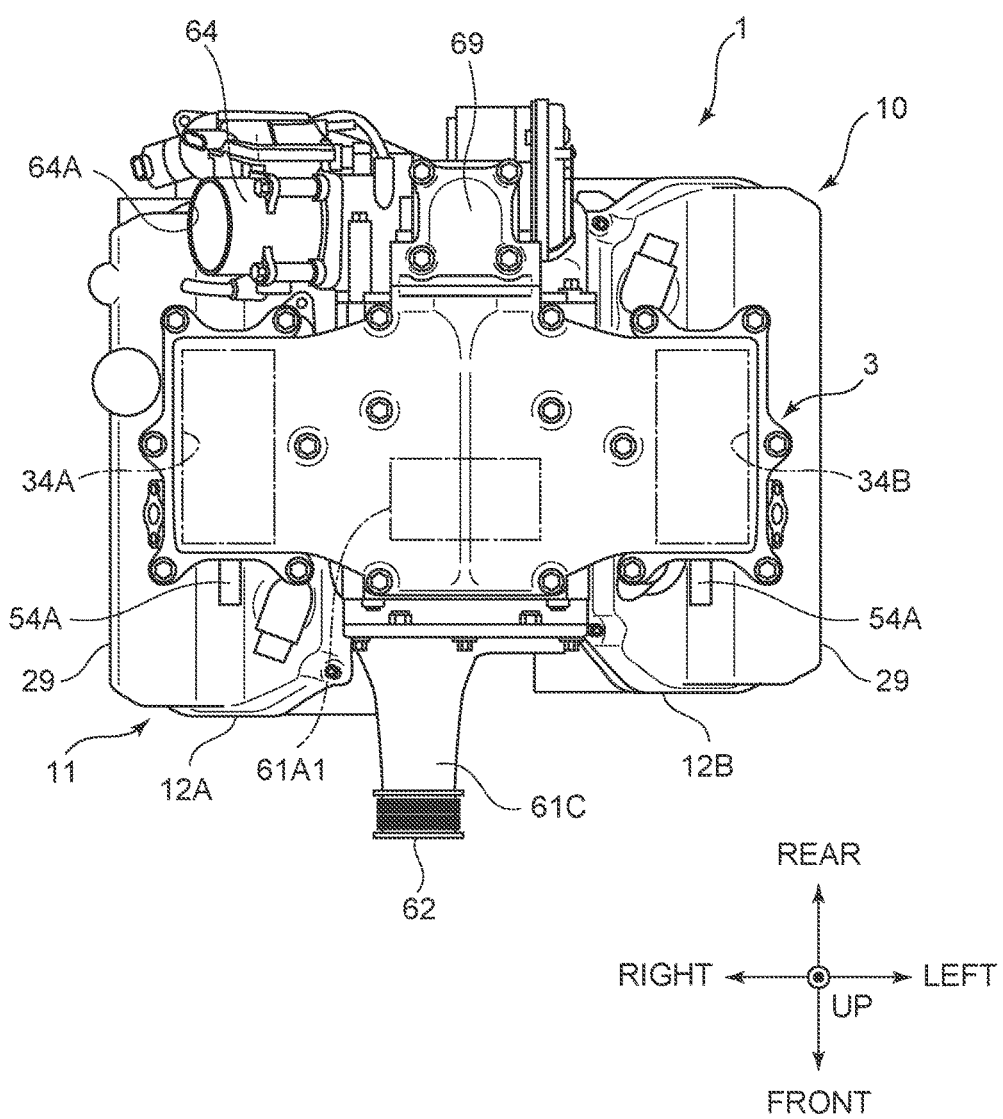
FIG. 2 is a plan view illustrating the overall configuration of the V engine illustrated in FIG. 1.

FIG. 1 is a front view illustrating an overall configuration of a V engine 1 according to the present embodiment, as viewed from the crankshaft direction front surface and is a partial cross-sectional view, and FIG. 2 is a plan view illustrating the overall configuration of the V engine 1 illustrated in FIG. 1.

As illustrated in FIG. 1, the V engine 1 according to one embodiment of the present invention includes an engine main body 10 as well as devices for an air intake system 3 and a fuel supply system 7.

[Engine Main Body]

The engine main body 10 according to the present embodiment is a four-cycle six-cylinder SOHC (Single Over Head Camshaft) gasoline V engine, with a bank angle (bank narrow angle) of 60°.

As illustrated in FIG. 1, the engine main body 10 includes: a cylinder block 11 having a V shape formed by bank of cylinders (banks) 12A and 12B; cylinder heads 2A and 2B respectively joined on upper sides of the left and the right banks 12A and 12B; and a crank casing 13 joined to a lower side of the cylinder block 11.

As illustrated in FIG. 2, the cylinder block 11 having the V shape include the left and the right banks 12A and 12B offset from each other in a front and rear direction (crankshaft direction) in such a manner that the right side (left side in FIG. 2) bank 12A is positioned on the front side and the left side (right side in FIG. 2) bank 12B is positioned on the rear side. As illustrated in FIG. 1, the left and the right banks 12A and 12B each include a corresponding one of sets of three cylinders 14A and 14B arranged side by side (see FIG. 12), and a single common crankshaft 15 is rotatably supported by the crank casing 13 in a lower area of the cylinders. The sets of three cylinders 14A and 14B are arranged side by side in the left and the right banks 12A and 12B in such a manner that the cylinder 14A on the front most side in the right side bank 12A serves as a first cylinder #1, and a second cylinder #2, a third cylinder #3, a fourth cylinder #4, a fifth cylinder #5, and a sixth cylinder #6 thereafter are alternately arranged on the left and right sides toward the rear side of the cylinder block 11 (see FIG. 12), with the number indicating the order of ignition of an ignition plug 22 described later (see FIG. 3).

As illustrated in FIG. 1, the cylinders 14A and 14B each have a cylindrical shape, with a piston 16 that reciprocates in axis directions L3 and L4 accommodated in each of the cylinders 14A and 14B. The piston 16 is formed to have the cylindrical shape and has a head portion closed and a pin hole formed through a body portion thereof in a radial direction. A connecting rod 17 has one end (small end (not illustrated)) accommodated in the body portion of the piston 16. The small end of the connecting rod 17 is coupled to the piston 16 with a piston pin 162 provided through a pin hole.

The crankshaft 15 with the connecting rod 17 converts the reciprocating motion (downward motion) of the piston 16 into rotational motion, and has a crank pin (not illustrated) in parallel with an axis passing through a rotation center of the crankshaft 15. The connecting rod 17 has the other end (large end (not illustrated)) coupled to the crank pin. Thus, the reciprocating motion of the piston 16 is converted into the rotational motion of the crankshaft 15.

Figure 3:
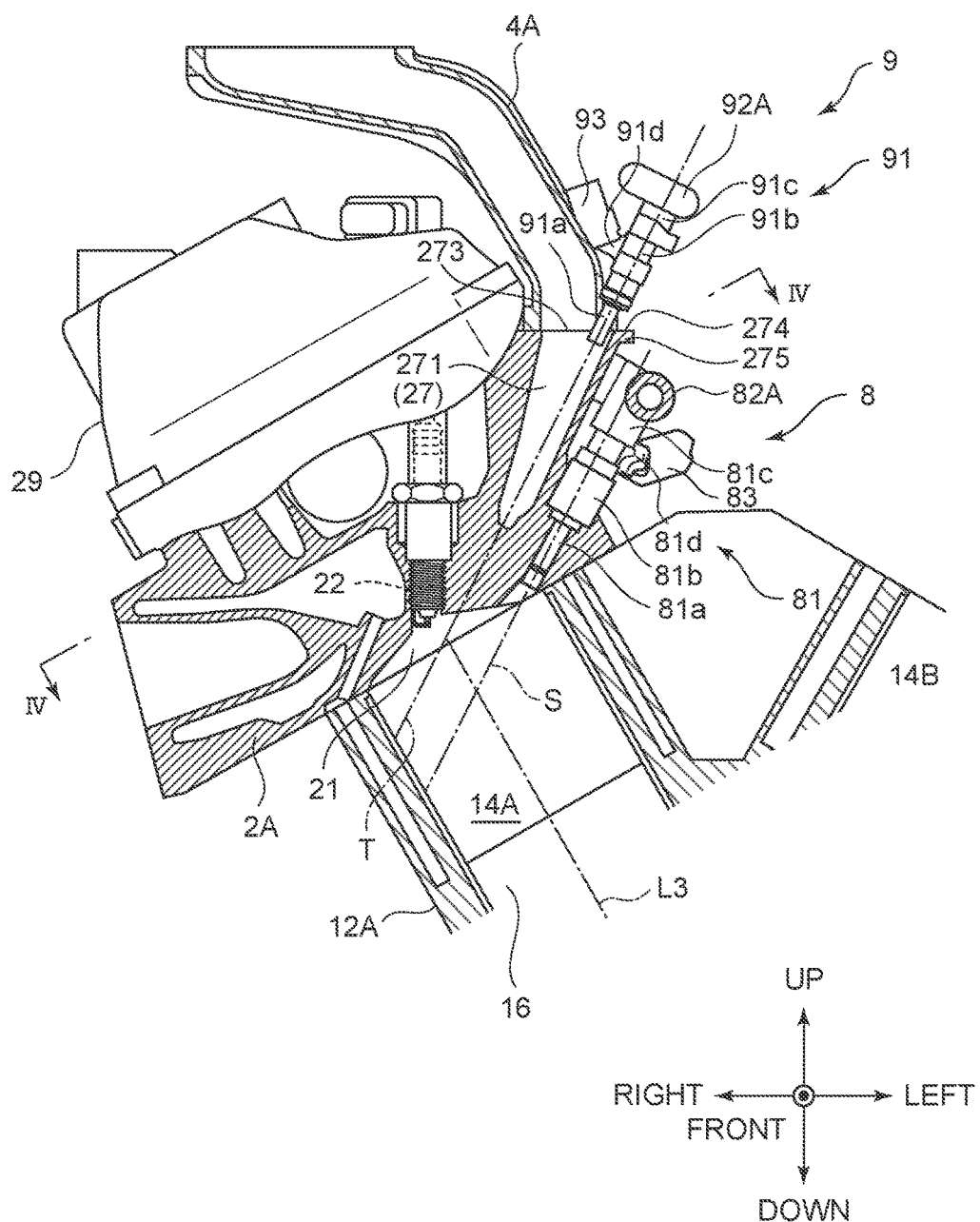
FIG. 3 is a cross-sectional view of a combustion chamber provided to a cylinder head illustrated in FIG. 1.
Figure 4:
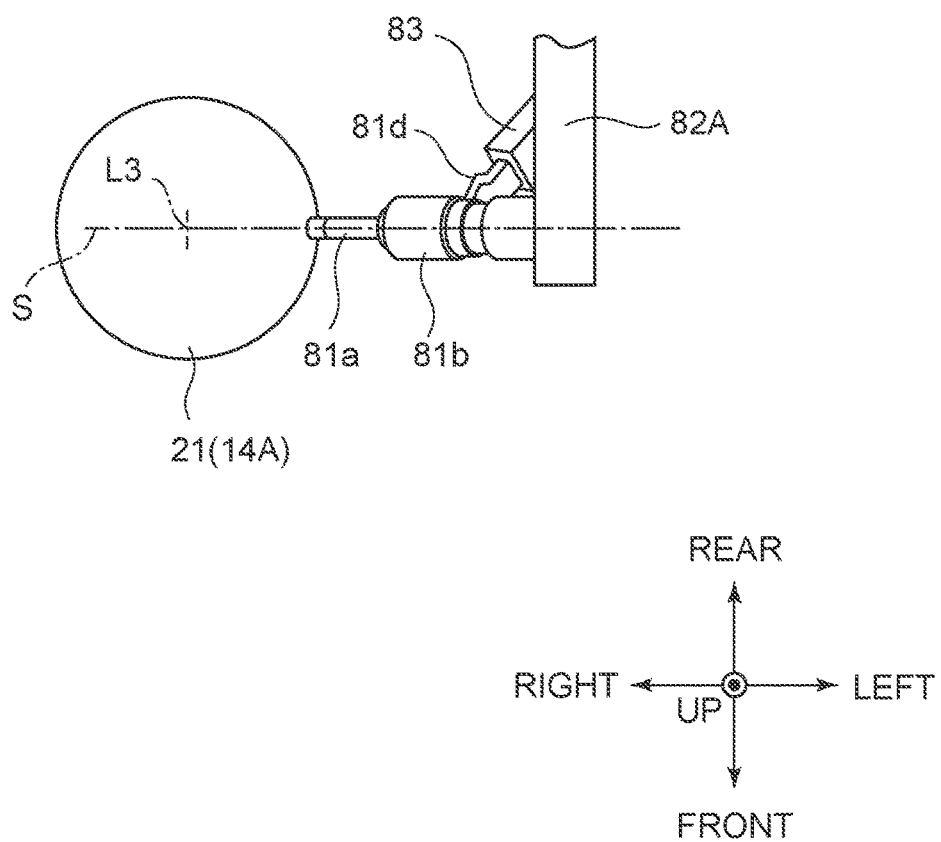
FIG. 4 is a schematic view of the combustion chamber illustrated in FIG. 3 as viewed in the IV-IV direction.
Figure 5:
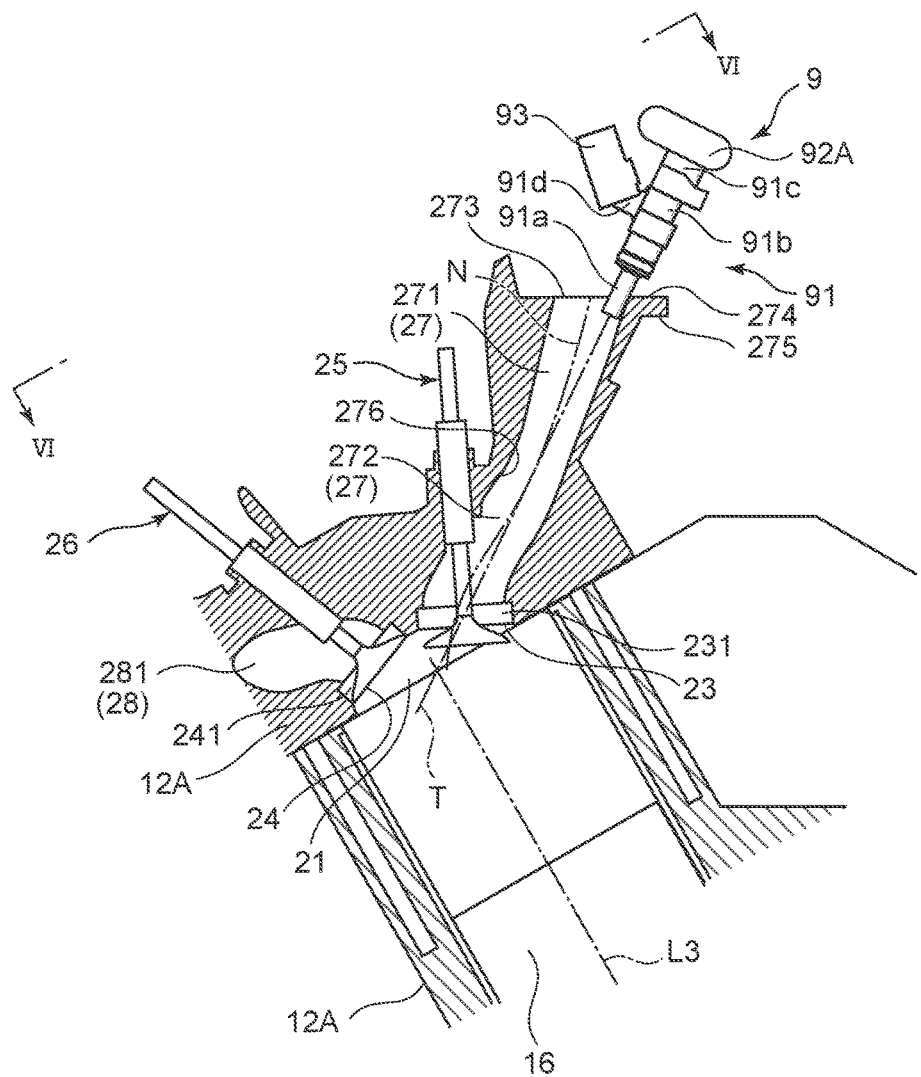
FIG. 5 is a cross-sectional view of an intake port provided to the cylinder head illustrated in FIG. 1.
Figure 5:
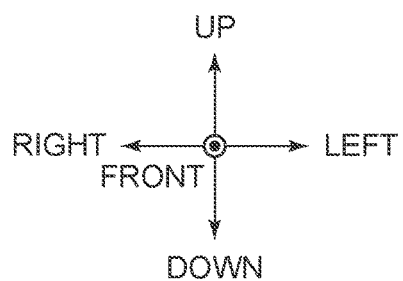
Figure 6:
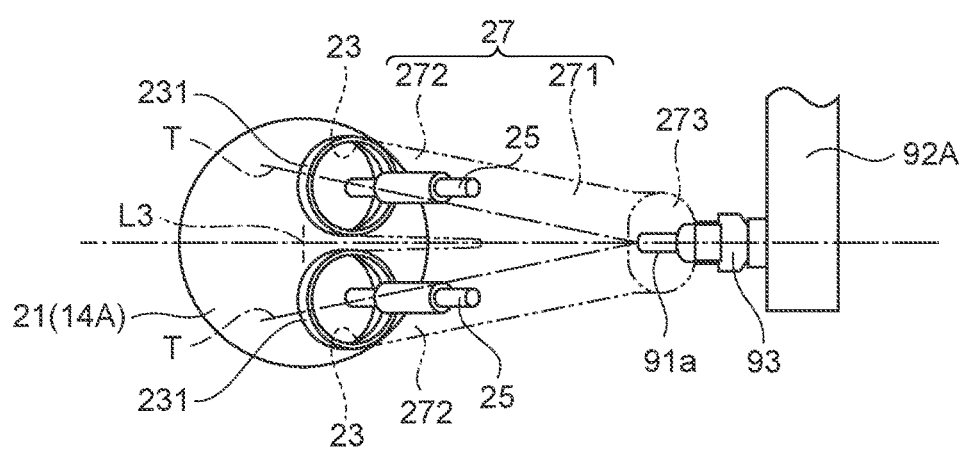
FIG. 6 is a schematic view of the intake port as viewed in the VI-VI direction in FIG. 5.
Figure 6:
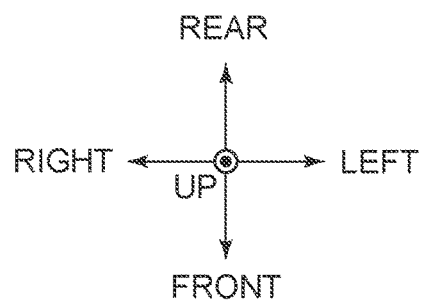

FIG. 3 is a cross-sectional view of a combustion chamber provided in the cylinder head illustrated in FIG. 1, and FIG. 4 is a schematic view of the combustion chamber illustrated in FIG. 3 as viewed in the IV-IV direction. FIG. 5 is a cross-sectional view of an intake port provided to the cylinder head illustrated in FIG. 1, and FIG. 6 is a schematic view of the intake port, illustrated in FIG. 5, as viewed in the VI-VI direction.

As illustrated in FIG. 3 and FIG. 5, a combustion chamber 21 is formed at a position, in each of the cylinder heads 2A and 2B, corresponding to the cylinder 14A or 14B formed in the cylinder block 11, and the ignition plug 22 is attached to each combustion chamber 21 as illustrated in FIG. 3. The ignition plug 22 ignites and burns an air-fuel mixture supplied to the combustion chamber 21 and an air-fuel mixture mixed in the combustion chamber 21 or the cylinder (cylinders 14A and 14B). The cylinder heads 2A and 2B according to the present embodiment are positioned on the inner sides of the left and the right banks 12A and 12B.

As illustrated in FIG. 5, the combustion chambers 21 are each provided with two intake air inlets 23 and two exhaust air outlets 24. The two intake air inlets 23, provided to each combustion chamber 21, are aligned in a row along the arrangement direction of the cylinders 14A and 14B on the inner side of the banks 12A and 12B, and are opened to the combustion chamber 21. Similarly, the two exhaust air outlets 24 provided to each combustion chamber 21 are aligned in a row along the arrangement direction of the cylinders 14A and 14B on the outer side of the banks 12A and 12B, and are opened to the corresponding combustion chamber 21.

The two intake air inlets 23 provided to each combustion chamber 21 are each provided with a valve seat (seat surface) 231, and are closed by an intake valve 25 provided to each of the intake air inlets 23. Similarly, the two exhaust air outlets 24 provided to each combustion chamber 21 are each provided with a valve seat (seat surface) 241, and are closed by an exhaust valve 26 provided to each of the exhaust air outlets 24.

The cylinder heads 2A and 2B are provided with an intake port 27 and a discharge port 28 for each combustion chamber 21.

The intake ports 27 pass through the axes L3 and L4 of the cylinders 14A and 14B, and are disposed along directions (hereinafter, referred to as "intake-discharge direction") orthogonal to the arrangement direction of the cylinders 14A and 14B and communicate with the two intake air inlets 23 opened to the combustion chamber 21. The intake port 27 includes an upstream side port 271 and a downstream side port 272.

As illustrated in FIG. 6, the upstream side port 271 serves as a flow path provided to each of the two intake air inlets 23 provided to each combustion chamber 21, provided on the upstream side in the intake port 27, and has an axis N passing through its cross-sectional center disposed on a plane passing through the axes L3 and L4 of the cylinders 14A and 14B. The upstream side port 271 is opened to a horizontal surface on the inner side of the cylinder heads 2A and 2B (see FIG. 5). The cylinder heads 2A and 2B are each provided with: an upstream side port opening 273 which has an oval shape elongated in the front and rear direction; and a flange (port injector attachment seat) 275 including a flat joining surface 274 provided around the opening (see FIG. 5).

As illustrated in FIG. 6, the downstream side port 272 serves as one flow passage provided to each intake air inlet 23, and is provided to branch from the upstream side port 271 on the downstream side of the upstream side port 271. Thus, each of the two downstream side ports 272 has an inlet provided to an outlet of the upstream side port 271, and has an outlet provided to an inlet of the valve seat 231 provided to the intake air inlet 23.

As illustrated in FIG. 5, the intake port 27 includes an arc portion 276 protruding downward in a center area of the intake port 27 on the upstream side of the valve seat 231. The arc portion 276 is provided for bending the axis N passing through the cross-sectional center of the intake port 27, so that a long intake air passage can be achieved, whereby the fuel injected from a port injector 91 is favorably mixed with air flowing in the intake port 27.

The discharge port 28 is provided along the intake and discharge direction on the opposite side of the intake port 27 relative to the combustion chamber 21, and communicates with the two exhaust air outlets 24 opened to the combustion chamber 21. The discharge port 28 includes upstream side ports 281 and downstream side ports (not illustrated). The upstream side ports 281 are flow paths each provided for the two exhaust air outlets 24 provided to each combustion chamber 21, and are each provided on the upstream side of the discharge port 28. The downstream side ports are flow paths each provided to the two exhaust air outlets 24 provided to each combustion chamber 21 and disposed on the downstream side of the two upstream side ports 281 such that the two upstream side ports 281 are joined, and have an axis passing through their centers disposed on planes passing through the axes of the cylinders 14A and 14B. Thus, the two upstream side ports 281 have an inlet provided to an outlet of the valve seat 241 provided to the exhaust air outlet 24, and has an outlet provided to an inlet of the downstream side port.

The engine main body 10 according to the present embodiment employs an offset crank structure as illustrated in FIG. 1.

A general V engine (the engine with the left and right banks not offset in the direction that is the same as the rotation direction of the crankshaft) has the axes L1 and L2 of the cylinders 14A and 14B in the left and the right banks 12A and 12B disposed in such a manner as to pass through a center P of the crankshaft 15. The left and the right banks are at positions indicated by two dot chain lines in FIG. 1.

In the engine main body 10 (V engine 1) according to the present embodiment employing the offset crank structure, the axes L1 and L2 of the cylinders 14A and 14B of the left and the right banks 12A and 12B are translated in the direction that is same as the rotation direction (direction indicated by an arrow E) of the crankshaft 15 relative to the center P of the crankshaft 15, with the distance between the center P of the crankshaft 15 and the upper surfaces of the cylinder heads 2A and 2B maintained. Thus, the axes L1 and L2 of the cylinders 14A and 14B of the left and the right banks 12A and 12B are offset to L3 and L4 with the bank angle maintained, and the axes L1 and L2 of the cylinders 14A and 14B move by δ (offset amount).

Thus, the right side bank (left side bank in FIG. 1) 2A is positioned at a higher position than the left side bank (right side bank in FIG. 1) 2B so that the level difference is provided, and the same level difference (H2-H1) is provided between the inlet openings of the intake ports 27 of the right side bank 12A and the left side bank 12B.

Thus, the engine main body 10 according to the present embodiment has an arrangement relationship in which the right side bank 12A is disposed on the front side than the left side bank 12B, and the right side bank 12A is disposed at a position higher than the left side bank 12B.

A camshaft (not illustrated), a rocker arm (not illustrated), and the like as a valve driving mechanism are disposed in an upper area of the cylinder heads 2A and 2B, and a rocker cover 29 are attached to cover these members. The intake valve 25 and the exhaust valve 26 are opened/closed with the camshaft and the rocker arm at a predetermined timing.

[Air Intake System]

Figure 7:
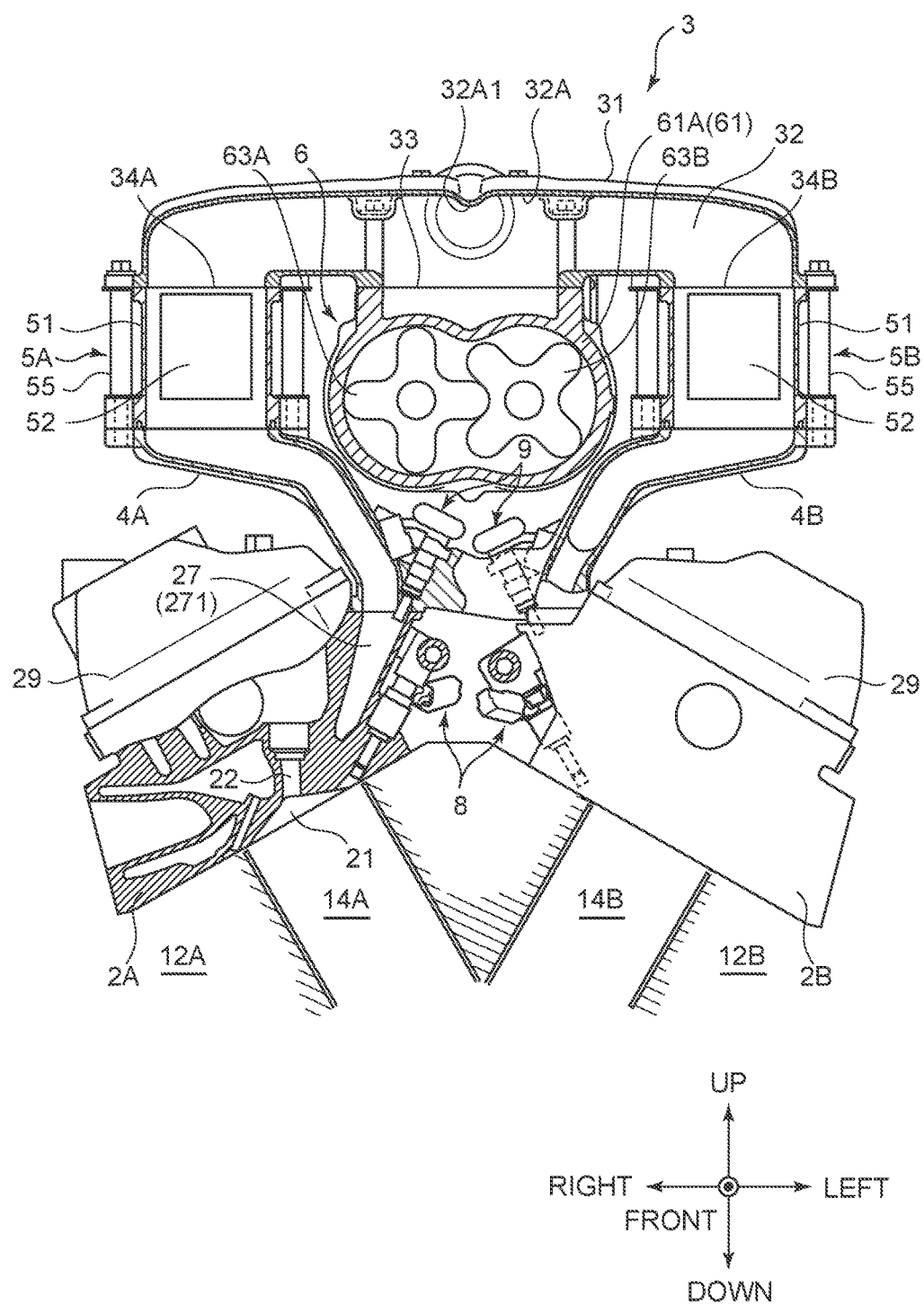
FIG. 7 is a front view of an air intake system illustrated in FIG. 1 and FIG. 2.
Figure 8:
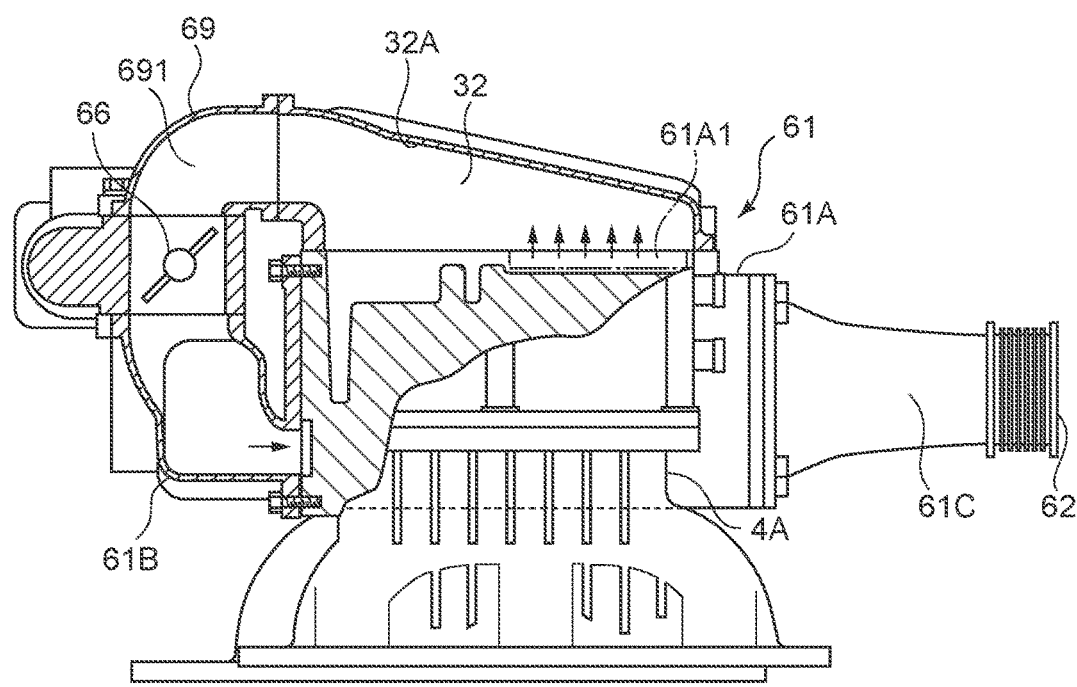
FIG. 8 is a side view of the air intake system illustrated in FIG. 1 and FIG. 2, and is a partial cross-sectional view.
Figure 8:
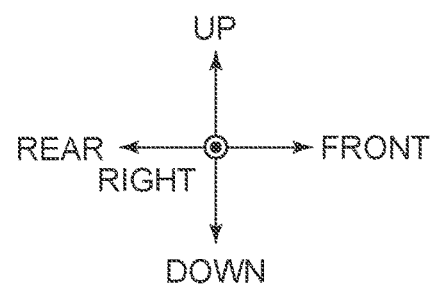

FIG. 7 is a front view of the air intake system 3 illustrated in FIG. 1 and FIG. 2. FIG. 8 is a side view of the air intake system 3 illustrated in FIG. 1 and FIG. 2, and is a partial cross-sectional view.

The air intake system 3 according to the present embodiment is for turbo charging air to the intake port 27 provided to each combustion chamber 21 of the cylinder heads 2A and 2B of the left and the right banks 12A and 12B.

As illustrated in FIG. 7, the air intake system 3 includes: intake manifolds 4A and 4B joined to the cylinder heads 2A and 2B of the left and the right banks 12A and 12B; inter coolers 5A and 5B joined on the left and the right intake manifolds 4A and 4B; an outlet housing 31 that connects the left and the right inter coolers 5A and 5B to each other; and a supercharger 6 suspended from the outlet housing 31.

The supercharger 6 is driven by driving force transmitted from the crankshaft 15 (see FIG. 1) to send out air (intake air), and is attached between the left and the right banks 12A and 12B and above the left and the right rocker covers 29. In this configuration, the supercharger 6 is positioned above crankshaft 15, with the lower surface of the supercharger 6 disposed above the upper surface of the rocker cover 29.

The supercharger 6 discharges the supplied air (intake air) to the downstream side in a compressing manner, and thus increases the pressure of air (intake air) supplied to the engine main body 10. The supercharger 6 according to the present embodiment includes a four-blade root supercharger.

The supercharger 6 includes: a housing 61; an input rotation shaft 62 (see FIG. 8) that is rotatably supported by the housing 61 and protrudes to the forward side of the housing 61; and a pair of rotors 63A and 63B that are accommodated in the housing 61 and are rotated in opposite directions by the rotation of the input rotation shaft 62.

As illustrated in FIG. 8, the housing 61 includes: a housing main body 61A; an inlet housing 61B joined to the rear surface of the housing main body 61A; and a bearing housing 61C joined to the front surface of the housing main body 61A.

As illustrated in FIG. 7, the housing main body 61A has an accommodating space in which the pair of rotors 63A and 63B are accommodated while being meshed with each other. The accommodating space is opened to the rear surface and an upper surface front area of the housing main body 61A. The air taken in through a rear surface opening passes between the pair of rotors 63A and 63B accommodated in the accommodating space, and then is discharged through an upper surface front area opening 61A1 (see FIG. 8). The housing main body 61A has an upper surface provided with a recess in which the upper surface front area opening 61A1 is formed. The recess has a rectangular shape with a short hand direction extending in the left and right direction and a longitudinal direction extending in the front and rear direction, and a flat joining surface is provided around the recess.

As illustrated in FIG. 8, the inlet housing 61B has an intake air passage through which the air, taken into the housing main body 61A, passes. The intake air passage is opened to the left side surface and the front surface of the inlet housing 61B, and thus the air taken in through the side opening passes through the intake air passage and then is taken into the housing main body 61A through the front surface opening.

As illustrated in FIG. 2, the inlet housing 61B has a right side surface (a left side surface in FIG. 2) provided with a throttle body 64. The throttle body 64 has a side surface provided with a cylindrical air inlet 64A and has an inner portion provided with a throttle valve (not illustrated). Thus, the air is introduced through the air inlet 64A with the air intake amount adjusted via the throttle valve.

As illustrated in FIG. 2, the bearing housing 61C has a cylindrical bearing portion provided on the right side (left side in FIG. 2) of the front surface of the housing main body 61A, so that the input rotation shaft 62 can be rotatably supported. Thus, the input rotation shaft 62 is disposed on the side of the right side bank 12A.

The input rotation shaft 62 is an input shaft that rotates when driving force is transmitted thereto from the crankshaft 15, and has a belt 68 wound around a pulley 67 provided to a front end portion thereof and a pulley (not illustrated) provided to a front end portion of the crankshaft 15 as illustrated in FIG. 1. Thus, the rotation of the crankshaft 15 is transmitted to the input rotation shaft 62 from the crankshaft 15 through the belt 68, and thus the driving force is transmitted from the crankshaft 15 to the input rotation shaft 62. However, the transmission of the driving force from the crankshaft 15 to the input rotation shaft 62, is not limited to a driving force transmission unit as a combination of the pulley 67 and the belt 68, and a driving force transmission unit as a combination of a sprocket and a chain may be employed for example.

As illustrated in FIG. 7, the pair of rotors 63A and 63B are accommodated in the housing main body 61A and are meshed with each other in the housing main body 61A. The rotor 63A (hereinafter, referred to as "drive rotor 63A") as one of the pair of rotors 63A and 63B has a rotation shaft including the input rotation shaft 62, and the rotation of the input rotation shaft 62 causes the drive rotor 63A to rotate in the same direction as the rotation direction of the input rotation shaft 62. The other rotor 63B (hereinafter, referred to as "driven rotor 63B") in mesh with the drive rotor 63A is driven by the drive rotor 63A to rotate in the direction opposite to the rotation direction of the drive rotor 63A. Thus, air in a space enclosed by the drive rotor 63A, the driven rotor 63B, and the housing main body 61A is pushed out to be discharged through the upper surface front area opening 61A1 of the housing main body 61A.

The outlet housing 31 distributes the air discharged from the supercharger 6 to the left and the right banks 12A and 12B, and is formed of light metal such as aluminum and synthetic resin such as FRP and prepreg. Thus, the outlet housing 31 can have a light weight, and can be integrally formed through forging of the light metal or from synthetic resin, which allows easier manufacturing of the same.

The outlet housing 31 is provided to connect the left and the right banks 12A and 12B to each other at the center of the left and the right banks 12A and 12B in the front and rear direction. The outlet housing 31 has a rectangular parallelepiped shape that is short in the level direction, has a rectangular shape in plan view with a longitudinal direction extending along the left and right direction, a short hand direction extending along the front and rear direction, and has an upper surface inclined to have a level reducing gradually reducing from the rear side toward the front side (see FIG. 8).

The outlet housing 31 has a distribution passage 32 through which the air discharged from the supercharger 6 is distributed to the left and the right banks 12A and 12B. The distribution passage 32 is formed along the outer shape of the outlet housing 31, and has a ceiling surface 32A inclined in such a manner that the level reduced from the rear side toward the front side, as in the case of the upper surface of the outlet housing 31. Thus, the air (intake air) discharged from the supercharger 6 obliquely collides against the ceiling surface 32A of the distribution passage 32, resulting in a larger area in which intake air collides against the ceiling surface 32A, and thus the colliding sound can be reduced compared with a configuration involving orthogonal collision against the ceiling surface 32A. Thus, smaller sound radiation due to the discharge pressure from the supercharger 6 can be achieved.

The distribution passage 32 is open at the center of the lower surface of the outlet housing 31 in the left and right direction. The outlet housing 31 has a center opening 33 formed in the same manner as the recess formed on the housing main body 61A (the rectangular shape with the short hand direction extending in the left and right direction and the longitudinal direction extending along the front and rear direction), and has a flat joining surface provided therearound. The supercharger 6 is attached to the outlet housing 31, with the joining surface of the housing main body 61A joined to this joining surface with six bolts. Thus, the supercharger 6 is suspended from the center of the outlet housing 31 in the left and right direction.

The distribution passage 32 is opened on both sides in the left and right direction on the lower surface of the outlet housing 31. The left and the right openings 34A and 34B of the outlet housing 31 are each formed to have a rectangular shape smaller than the center opening 33, with a flange with a flat joining surface provided therearound.

The distribution passage 32 has a ceiling surface provided with a ridge 32A1 protruding downward at the center in the left and right direction. The ridge 32A1 is extends along the front and rear direction to divide the distribution passage 32 in two, that is, to left and right sides. Thus, the air introduced through the center opening 33 is distributed to left and right passage by the ridge 32A1 in such a manner that air distributed to the right is discharged from the right opening 34A and the air introduced to the left is discharged from the left opening 34B. Thus, the distribution of the air (intake air) discharged from the supercharger 6 to the left and the right banks 12A and 12B is facilitated, and thus the intake air is evenly supplied to the left and the right banks 12A and 12B.

The distribution passage 32 is opened at the center of the rear surface of the outlet housing 31 in the left and right direction. As illustrated in FIG. 8, the rear surface opening of the outlet housing 31 is an opening that communicates with a bypass path 691 described later, has a circular shape, and has a joining surface provided therearound. A bypass housing 69 is joined to this joining surface, and the bypass housing 69 is attached to the outlet housing 31 with two bolts.

The bypass housing 69 includes the bypass path 691 through which the air discharged from the supercharger 6 is bypassed to the inlet housing 61B. The bypass path 691 is opened on the front surface and the lower surface of the bypass housing 69. The front surface opening of the bypass housing 69 is formed to be substantially the same as the rear surface opening of the outlet housing 31, and communicates with the rear surface opening of the outlet housing 31 as described above.

The bypass housing 69 has a lower surface provided with a bypass valve 66. The bypass valve 66 has a lower surface connected to the inlet housing 61B, and the bypass path 691 and the intake air passage communicate with each other via the bypass valve 66. Thus, the air (intake air) discharged to the outlet housing 31 from the supercharger 6 partially returns to the intake air passage through the bypass path 691, and thus the discharge air pressure (discharge intake air pressure) is adjusted. Returning air pressure (return intake air pressure) is adjusted with the bypass valve 66.

As illustrated in FIG. 7, the left and the right inter coolers 5A and 5B respectively cools the air discharged from the supercharger 6 and distributed to the left and right sides, and are separately provided to the left and the right banks 12A and 12B while being positioned on both left and right sides of the supercharger 6 and above the left and the right rocker covers 29.

The left and right inter coolers 5A and 5B have the same structures on left and right sides, and each include: a casing 51; an inter cooler core 52 accommodated in the casing 51; and a plurality of collars 55 arranged around the casing 51.

The casing 51 accommodates the inter cooler core 52 and is formed of light metal such as aluminum or synthetic resin such as FRP and prepreg. Thus, the casing 51 can have a light weight, and can be formed through forging of the light metal or integrally formed from synthetic resin, which allows easier manufacturing of the same.

The casing 51 has a rectangular parallelepiped shape and has a rectangular shape in plan view, with the short hand direction extending in the left and right direction and the longitudinal direction extending in the front and rear direction, and incorporates an intake air passage through which the air passes to be supplied to the intake manifolds 4A and 4B from the outlet housing 31. The intake air passage is opened in the upper surface and the lower surface of the casing 51.

The upper surface opening of the casing 51 is formed in the same manner as the left and right openings 34A and 34B of the outlet housing 31 (the rectangular shape with the short hand direction extending in the left and right direction and the longitudinal direction extending in the front and rear direction) and has a flat joining surface provided therearound. The joining surface of the flange provided to the outlet housing 31 is joined to this joining surface. The lower surface opening of the casing 51 is formed in the same manner as the upper surface opening (the rectangular shape with the short hand direction extending in the left and right direction and the longitudinal direction extending in the front and rear direction) and has a flat joining surface provided therearound.

The inter cooler core 52 cools the air flowing in the intake air passage, and is provided in such a manner that a pipe, through which cooling water, supplied from the outside of the casing 51 and discharged to the outside of the casing 51, passes, is formed therethrough. The pipe has an inlet side 54A (see FIG. 1) disposed on the upper side of the front surface of the casing 51, and an outlet side 54B (see FIG. 1) disposed on the lower side of the front surface of the casing 51. Thus, bubbles in the cooling water is discharged upward.

The plurality of collars 55 are provided for transmitting a load from the outlet housing 31 to the intake manifolds 4A and 4B and for protecting the casing 51. The plurality of collars 55 according to the present embodiment include six collars that are arranged between the flange of the casing 51 and the outlet housing 31 at a substantially equal interval.

The six collars 55 are each a cylindrical tube member in which a bolt is inserted, and disk-shaped flanges are provided on both sides of the tube member. The level of the collar 55 is the same as the level of the lower surface of the outlet housing 31 from the upper surface of the flange of the casing 51, or is set to be higher than the level by a length corresponding to a gasket (not illustrated).

The six bolt are each inserted through the flange of the outlet housing 31, the collar 55, and the flange of the casing 51, and are each screwed with a female screw provided on a flange of the intake manifold 4A, 4B described later. Thus, the outlet housing 31, the inter coolers 5A and 5B, and the intake manifolds 4A and 4B are integrated. Thus, the load is transmitted from the outlet housing 31 to the intake manifolds 4A and 4B, whereby the casing 51 is protected.

The left and the right intake manifolds 4A and 4B are provided for distributing air (intake air) among the plurality of cylinders (the sets of three cylinders 14A and 14B) provided to the left and the right banks 12A and 12B, and is formed of light metal such as aluminum or synthetic resin such as an FRP or prepreg. Thus, the left and the right intake manifolds 4A and 4B can be light weight. With the left and the right intake manifolds 4A and 4B formed through forging of the light metal or integrally formed from synthetic resin, which allows easier manufacturing of the same.

The left and the right intake manifolds 4A and 4B according to the present embodiment are further provided for supporting the supercharger 6, the outlet housing 31, and the left and the right inter coolers 5A and 5B. The left and the right intake manifolds 4A and 4B are integrally formed while being provided between the lower surfaces of the inter coolers 5A and 5B and the joining surfaces of the cylinder heads 2A and 2B.

As described above, the engine main body 10 according to the present embodiment employs the offset crank structure. The right side bank 12A (the left side bank in FIG. 2) is positioned at a higher level than the left side bank 12B (the right side bank in FIG. 2), so that the difference in level is provided. The same difference in level is provided between inlet openings of the intake ports 27 of the right side bank 12A and the left side bank 12B.

Thus, the same difference in level (H2-H2) is further provided between the attachment levels (the inlet openings of the intake ports 27) between the intake manifolds 4A and 4B according to the present embodiment in the right side bank 12A and the left side bank 12B.

Thus, the left and the right intake manifolds 4A and 4B according to the present invention have a configuration in which the intake manifold 4A (hereinafter, referred to as "right side intake manifold 4A") on the side of the right side bank 12A (the left side bank in FIG. 7) is set to be shorter than the intake manifold 4B (hereinafter, referred to as "left side intake manifold 4B") on the side of the left side bank 12B (the right side bank in FIG. 7). The outlet housing 31 and the supercharger 6 suspended from the outlet housing 31 take a horizontal posture. As a result, the right side intake manifold 4A has a support rigidity higher than that of the left side intake manifold 4B.

The input rotation shaft 62 (see FIG. 2) is disposed on the side of the right side bank 12A and thus is disposed on the side (the side of the right side intake manifold 4A) with a higher support rigidity and a front side position (the right side bank 12A) of the engine main body 10, and thus can suppress the vibration of the supercharger 6.

The left and the right intake manifolds 4A and 4B are curved from the left and right inter coolers 5A and 5B toward the left and the right banks 12A and 12B along the outer shape of the rocker cover 29, and support the supercharger 6, the outlet housing 31, and the left and the right inter coolers 5A and 5B. The left and the right intake manifolds 4A and 4B include surge portions facing the joining surfaces of the inter coolers 5A and 5B, and include branch passages branched from the surge portions to the intake ports of the left and the right cylinder heads 2B.

The surge portions are opened to the joining surfaces of the inter coolers 5A and 5B, and the branched passages are opened to the joining surfaces joined to the intake ports 27. The left and the right intake manifolds 4A and 4B have surge portion openings formed in the same manner as the lower surface opening of the casing 51 (a rectangular shape with the short hand direction extending in the left and right direction and the longitudinal direction extending in the front and rear direction) with flanges with a flat joining surface provided therearound.

The joining surfaces of the flanges provided to the inter coolers 5A and 5B are joined to the joining surfaces, and six bolts are inserted through the flange of the outlet housing 31, the collars 55, and the flange of the casing 51 to be screwed with the female screws provided on the flanges of the intake manifolds 4A and 4B. Thus, the outlet housing 31, the inter coolers 5A and 5B, and the intake manifolds 4A and 4B are integrated.

The intake port joining surface openings of the left and the right intake manifolds 4A and 4B are formed in the same manner as the upstream side port openings of the cylinder heads 2A and 2B (oval shape elongated in the front and rear direction), and have flanges with flat joining surfaces provided therearound. The joining surfaces are joined to the joining surfaces of the cylinder heads 2A and 2B. Four bolts are provided for each of the left and the right banks 12A and 12B. The bolts are inserted through the flanges of the intake manifolds 4A and 4B to be screwed with male screwed provided to the flanges 275 of the cylinder heads 2A and 2B. Thus, the left and the right intake manifolds 4A and 4B, integrated with the outlet housing 31 and the inter coolers 5A and 5B, are attached to the cylinder heads 2A and 2B.

A coupling wall is provided between adjacent branched passages in the left and the right intake manifolds 4A and 4B. The coupling wall couples the adjacent branched passages to each other, closes a space between the adjacent branched passages, and forms a tunnel shaped space between the banks 12A and 12B. The coupling wall has a wall surface provided with a reinforcement rib. Thus, the left and the right intake manifolds 4A and 4B have the inner sides protected by the coupling wall of the left and the right intake manifolds 4A and 4B. Thus, safety of pipes (high pressure delivery pipes 82A and 82B, low pressure delivery pipes 92A and 92B, and the like) and components (the direct injector 81 and the port injector 91 and the like) of fuel injection devices 8 and 9 disposed on the inner sides of the intake manifolds 4A and 4B can be guaranteed. The coupling wall forms the tunnel shaped space between the left and the right banks 12A and 12B, and thus both side wall surfaces of the coupling wall have a function of guiding air flowing in the tunnel shaped space. Thus, an effect of cooling the pipes and the components of the fuel injection devices 8 and 9 disposed on the inner sides of the left and the right intake manifolds 4A and 4B can be expected.

The left and the right intake manifolds 4A and 4B have lower end portions provided with left and right coupling portions. The left and the right coupling portions are provided between lower end portions of the left and the right intake manifolds 4A and 4B so that the lower end portions are coupled to each other. The left and the right coupling portions may be provided on both sides in the front and rear direction, may be provided at a plurality of portions along the front and rear direction at an interval, or may be provided in such a manner as to form a surface so that a bottom wall can be formed. Thus, the rigidity of the left and the right intake manifolds 4A and 4B can further be improved.

As described above, in the air intake system 3 according to the present embodiment, the supercharger 6 is disposed on the inner side of the closed cross-sectional structure enclosed by the outlet housing 31, the left and right inter coolers 5A and 5B, and the left and the right intake manifolds 4A and 4B, as viewed from the front surface in the direction of the crankshaft 15. Thus, the suspended supporting structure of the supercharger 6 can have an even higher rigidity, whereby more stable supporting can be achieved.

The outlet housing 31, the left and right inter coolers 5A and 5B, and the left and the right intake manifolds 4A and 4B as separate structures can be assembled by being fastened to each other with bolts. Thus, a structure in which the pipes and the components of the fuel injection devices 8 and 9 are accommodated on the inner sides of the left and the right banks can be easily assembled.

The outlet housing 31, the left and right inter coolers 5A and 5B, and the left and the right intake manifolds 4A and 4B are formed as separate structures. Thus, the structure can conform with the difference between the side of the right side bank (high bank) 12A and the side of the left side bank (low bank) 12B simply by changing the levels of the left and the right intake manifolds 4A and 4B. The left and right inter coolers 5A and 5B can be shared by the left and the right banks 12A and 12B.

The outlet housing 31 and the casing 51 of the left and right inter coolers 5A and 5B are formed of rigid resin or with light metal, and thus can have lighter weight. Thus, a weight load on the left and the right intake manifolds 4A and 4B can be reduced. Thus, the durability of the left and the right intake manifolds 4A and 4B can be improved. Furthermore, the lighter air intake system 3 leads to a lower center of gravity of the V engine 1 and thus contributes to improvement of the maneuverability of the vehicle (prevention of under steering).

A sound absorbing material may be provided between the components (the outlet housing 31, the left and the right inter coolers 5A and 5B, and the left and the right intake manifolds 4A and 4B) and the supercharger 6. Thus, the sound radiation from the supercharger 6 is reduced, and a load due to attack of the supercharger 6 to the fuel related components at the time of collision can be reduced.

In the air intake system described above, the supercharger 6 is suspended from the outlet housing 31 has a flat rectangular parallelepiped shape extending in the direction of the left and the right banks. However, this suspending structure should not be construed in a limiting sense. For example, the charger may be placed and fixed on the left and right inter coolers 5A and 5B.

[Fuel Supply System]

Figure 9:
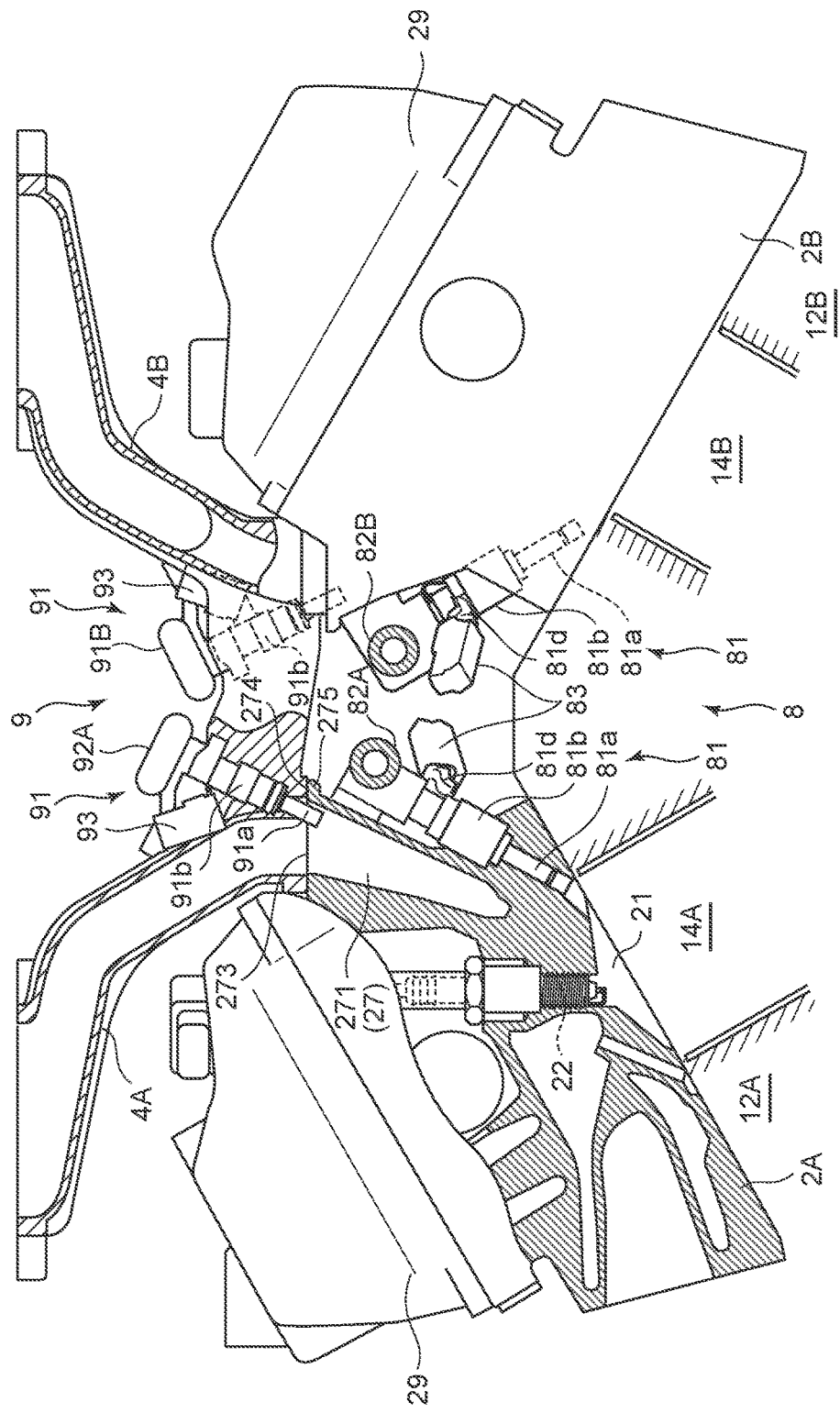
FIG. 9 is an enlarged front view of a fuel supply system illustrated in FIG. 1.
Figure 10:
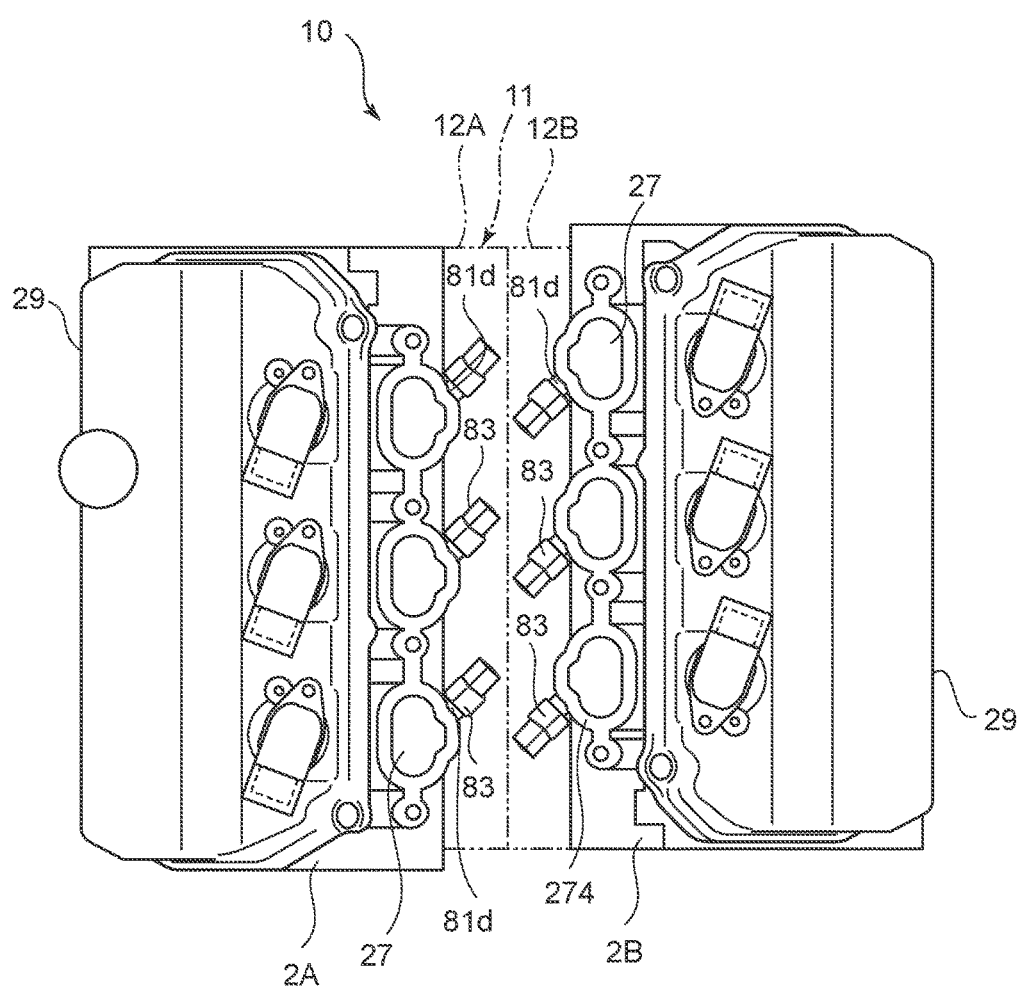
FIG. 10 is a plan view illustrating a state where an electrical connector is attached to a connector attachment member illustrated in FIG. 9.
Figure 11:
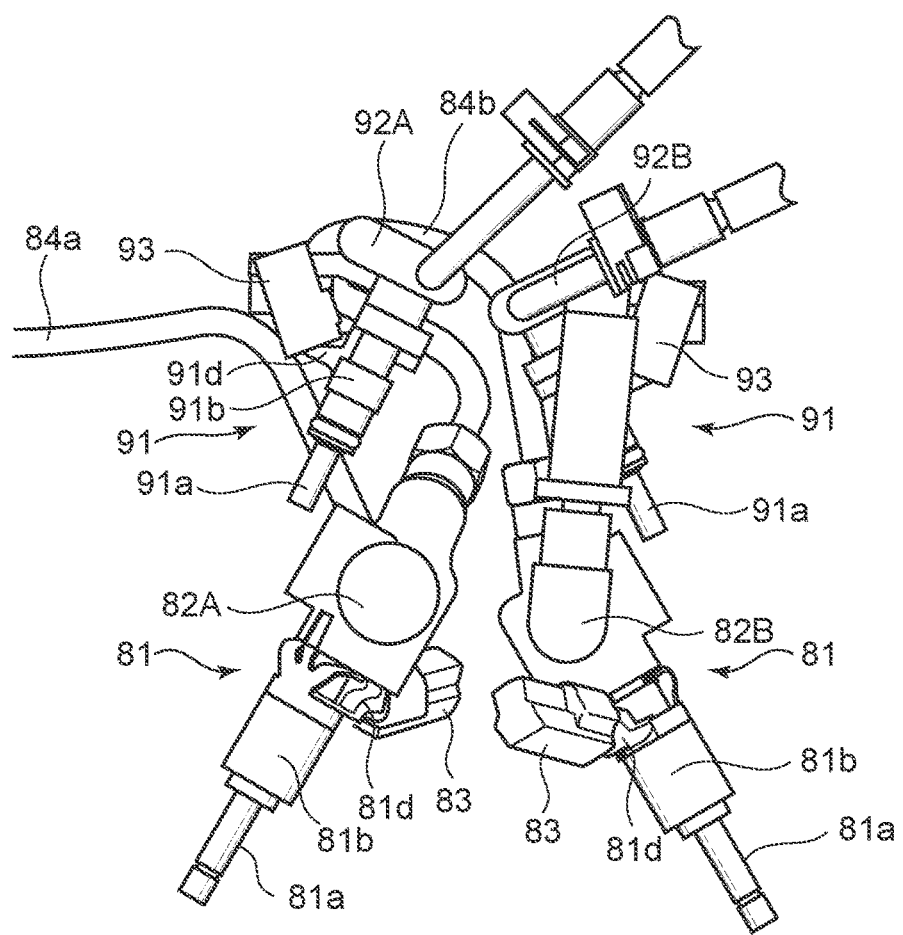
FIG. 11 is a front view illustrating a direct injector and a port injector illustrated in FIG. 9.
Figure 12:
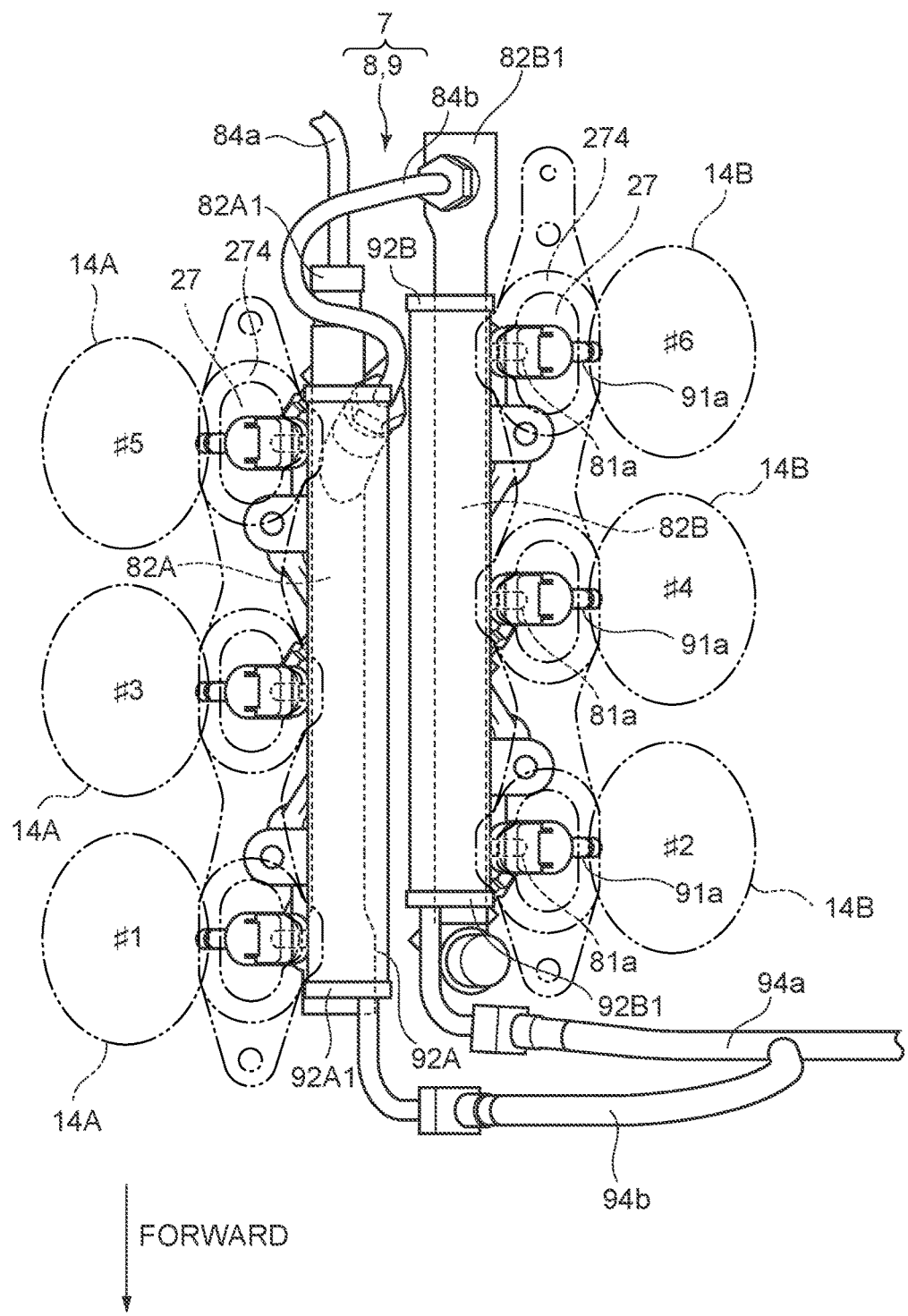
FIG. 12 is a plan view illustrating the direct injector and the port injector illustrated in FIG. 9.

FIG. 9 is a front view illustrating a cylinder injection device and a port injection device illustrated in FIG. 1. FIG. 10 is a plan view illustrating a state in which an electrical connector is attached to a connector attachment member in FIG. 9. FIG. 11 is a front view illustrating the direct injector and the port injector illustrated in FIG. 9. FIG. 12 is a plan view illustrating the direct injector and the port injector illustrated in FIG. 9.

The fuel supply system according to the present embodiment includes two types of fuel injection devices 8 and 9 which is a cylinder injection type directly injecting fuel into the combustion chamber 21 provided to each of the cylinders 14A and 14B and a port injection type injecting fuel in to the intake port 27 provided to each combustion chamber 21.

As illustrated in FIG. 9, the cylinder injection fuel injection device 8 (hereinafter, referred to a "cylinder injection device 8") includes: direct injectors 81 each provided for a corresponding one of the cylinders 14A and 14B in the left and the right banks 12A and 12B; high pressure delivery pipes 82A and 82B commonly provided to the plurality of direct injectors 81 in the left and the right banks 12A and 12B; and a high pressure fuel pump (not illustrated) that supplies fuel to the high pressure delivery pipes 82A and 82B.

The direct injectors 81 are for directly injecting fuel into the combustion chambers 21 provided to the cylinders 14A and 14B, and are disposed along the intake and discharge direction at positions one the outer side of the intake port 27 in the cylinder radial direction as illustrated in FIG. 3. More specifically, the direct injectors 81 are arranged to have the center axis disposed on a plane passing through the axis L3 (L4) of the cylinder 14A(14B) in a lower area of the downstream side port 272 as a bifurcated portion of the intake port 27. Thus, the direct injectors 81 are arranged to be orthogonal to the arrangement direction of the cylinders 14A (14B) and are alternately arranged on the inner sides of the left and the right banks 12A and 12B in plan view.

As illustrated in FIG. 11, the direct injector 81 includes: a nozzle portion 81*a* with a small diameter; a body portion 81*b* with a larger diameter than the nozzle portion 81*a*; a delivery pipe coupling portion (not illustrated) having a larger diameter than the nozzle portion 81*a* and a smaller diameter than the body portion 81*b*; and a connector attachment member 81*d* (first connector attachment member) provided on a radially outer side of the body portion 81*b*. The nozzle portion 81*a* has a distal end provided with an injection hole (not illustrated) with which fuel, supplied from the high pressure fuel pump, is injected while spreading in a conical form. The body portion 81*b* accommodates a control device (not illustrated) that controls an injected amount and an injected timing of the fuel. High pressure delivery pipes 82A and 82B are coupled to the delivery pipe coupling portion, and fuel is supplied from the high pressure fuel pump through high pressure delivery pipes 82A and 82B.

The electrical connector 83 (first electrical connector) is attached to the connector attachment member 81*d*. A direction in which the electrical connector 83 is attached to the connector attachment member 81*d* is the radial direction of the direct injector 81 (body portion 81*b*). The electrical connector 83 is attached to the connector attachment member 81*d* from the outer side in the radial direction. Thus, the electrical connector 83 is detached from the connector attachment member 81*d* toward the outer side in the radial direction.

As illustrated in FIG. 10, the direct injectors 81 have the connector attachment members 81*d* alternately arranged between the left and the right banks 12A and 12B which facing each other in oblique parallel directions in plan view. Thus, the connector attachment members 81*d* on the right side bank 12A (the left side bank in FIG. 10) are orientated obliquely rearward and the connector attachment members 81*d* on the left side bank 12B (the right side bank in FIG. 10), offset rearward relative to the right side bank 12A, are orientated obliquely forward. The direct injector 81 has the center axis inclined to be directed obliquely upward in the space between the left and the right banks 12A and 12B, and is attached in such a manner that the fuel injected from the direct injector 81 (injection axis S) is oriented into the cylinder.

As illustrated in FIG. 11, the high pressure delivery pipes 82A and 82B supply fuel to the direct injector 81. The direct injectors 81 are arranged to be orthogonal to the arrangement direction of the cylinders 14A (14B). Thus, the high pressure delivery pipes 82A (82B) are arranged along the arrangement direction of the cylinders 14A (14B). With this configuration, the high pressure delivery pipes 82A and 82B are disposed on the inner sides of the left and the right banks 12A and 12B and are coupled to the delivery pipe coupling portions of the direct injectors 81 (see FIG. 9).

The fuel supplied to the high pressure delivery pipes 82A and 82B is supplied to the direct injector 81 through the high pressure delivery pipes 82A and 82B. The control device accommodated in the body portion 81*b* is controlled with an electrical signal supplied from the electrical connector 83 attached to the connector attachment member 81*d*, in such a manner that a desired amount of fuel is supplied to the nozzle portion 81*a* at a desired injection timing. Thus, the fuel supplied to the nozzle portion 81*a* is injected through a nozzle port into a cylinder (cylinders 14A and 14B) in such a manner as to spread in a conical form.

As illustrated in FIG. 12, the high pressure delivery pipes 82A and 82B provided to the left and the right banks 12A and 12B have inlets on a rear end portion side. The high pressure delivery pipe 82A (hereinafter, referred to as "right side high pressure delivery pipe 82A") provided to the right side bank 12A has a rear end portion 82A1 connected to the high pressure fuel pump through a fuel pipe 84*a*. The rear end portion 82A1 of the right side high pressure delivery pipe 82A and a rear end portion 82B1 of the high pressure delivery pipe 82B (hereinafter, referred to as "left side high pressure delivery pipe 82B") provided to the left side bank 12B are connected to each other through a fuel pipe 84*b*. Thus, the fuel supplied from the high pressure fuel pump to the right side high pressure delivery pipe 82A is distributed to the left side high pressure delivery pipe 82B. The fuel supplied to the right side high pressure delivery pipe 82A is supplied to the direct injector 81 provided to the right side bank 12A. The fuel supplied to the left side high pressure delivery pipe 82B is supplied to the direct injector 81 provided to the left side bank 12B.

As described above, the engine main body 10 according to the present embodiment employs the offset crank structure. As illustrated in FIG. 9, the right side bank 12A (the left side bank in FIG. 9) is disposed at a position higher than the left side bank 12B (the right side bank in FIG. 9). Due to the level difference, the same level difference is provided between the intake ports 27 on the right side bank 12A and the left side bank 12B.

Thus, the same level difference is provided also between the direct injectors 81 according to the present embodiment in the right side bank 12A and the left side bank 12B. The same level difference is provided between the connector attachment members 81*d*.

Similarly, the same level difference is provided between attachment levels of the high pressure delivery pipes 82A and 82B according to the present embodiment in the right side bank 12A and the left side bank 12B.

As illustrated in FIG. 9, the port injection fuel injection device 9 (hereinafter, referred to as a "port injection device 9") includes a port injector 91 provided to the intake port 27 provided for each combustion chamber 21 in the left and the right banks 12A and 12B; low pressure delivery pipes 92A and 92B commonly provided for a plurality of the port injectors 91 in the left and the right banks 12A and 12B, and a low pressure fuel pump (not illustrated) that supplied fuel to the low pressure delivery pipes 92A and 92B.

The port injectors 91 inject fuel to the intake port 27 provided for each combustion chamber 21, and are arranged along the intake and discharge direction at positions on the same side as the direct injectors 81 relative to the intake port 27 as illustrated in FIG. 5. More specifically, the port injector 91 has the center axis positioned on a plane passing through the axis L3 (L4) of the cylinders 14A (14B) at a position where the intake port 27 is most protruded toward the inner side of the bank of the cylinder block 11. Thus, the center axis of the port injector 91 is disposed on the same plane as the center axis of the direct injector 81. The port injectors 91 are arranged to be orthogonal to the arrangement direction of the cylinders 14A (14B). Thus, the port injectors 91 are alternately disposed on the inner sides of the left and the right banks 12A and 12B in plan view. The fuel (injection axis T) injected from the port injector 91 is distributed to the two branches of the downstream side ports 272 on the downstream side of the intake port 27, and thus is evenly distributed on both sides of the plane passing through the axis L3 (L4) of the cylinder 14A (14B) and the center axis of the direct injectors 81.

As illustrated in FIG. 5, an injection axis T, indicating the injection direction of the port injector 91, is oriented in such a direction that the fuel injected from the port injector passes through a lower area of the arc portion 276. Thus, an angle between the injection axis T indicating the injection direction of the port injector 91 and the lower surface of the cylinder head 2A (2B) is larger than an angle between a straight line, which passes through an injection position of the port injector 91 and contacts a lower most surface of the arc portion 276, and the lower surface of the cylinder head 2A (2B).

An injection axis S of the port injector 91 and the injection axis T of the direct injector 81 are in parallel with each other or cross each other on a front side in the fuel injection direction (see FIG. 3). In such a case, an angle between the injection axis S of the port injector 91 and the lower surface of the cylinder head 2A (2B) is equal to or larger than an angle between the injection axis T of the direct injector 81 and the lower surface of the cylinder head 2A (2B). Thus, the fuel injected from the direct injector 81 spreads against a tumble flow generated in the cylinder 14A (14B).

As illustrated in FIG. 11, the port injector 91 includes: a nozzle portion 91a with a small diameter; a body portion 91b with a larger diameter than the nozzle portion 91a; a delivery pipe coupling portion (not illustrated) having a larger diameter than the nozzle portion 91a and a smaller diameter than the body portion 91b; and a connector attachment member 91d (second connector attachment member) provided on a radially outer side of the body portion 91b. The nozzle portion 91a has a distal end provided with an injection hole (not illustrated) with which fuel, supplied from the low pressure fuel pump, is injected while spreading in a conical form toward two downstream ports. The body portion 91b accommodates a control device (not illustrated) that controls an injected amount and an injected timing of the fuel. Low pressure delivery pipes 92A and 92B are coupled to the delivery pipe coupling portion, and fuel is supplied from the low pressure fuel pump through low pressure delivery pipes 92A and 92B.

The electrical connector 93 (second electrical connector) is attached to the connector attachment member 91d. A direction in which the electrical connector 93 is attached to the connector attachment member 91d is an obliquely upward direction relative to the port injector 91 (body portion 91b). The electrical connector 93 is attached to the connector attachment member 91d from the obliquely upward direction. Thus, the electrical connector 93 is detached from the connector attachment member 91d toward the obliquely upward direction.

The port injector 91 has the connector attachment member 91d arranged toward the outer side of the bank. Specifically, the nozzle portion 81a of the port injector 91 is arranged to protrude toward the intake port 27 (cylinder head 2A) beyond the joining surfaces of the cylinder head 2A and the intake manifolds 4A and 4B. The nozzle portion 91a of the port injector 91 has a distal end positioned in the intake port 27. The center axis of the port injector 91 is inclined toward obliquely upper side in the space between the left and the right banks 12A and 12B. The port injector 91 is attached in such a manner that the injected fuel (injection axis T) is oriented to the umbrella center of the intake valve 25.

As illustrated in FIG. 11 and FIG. 12, the low pressure delivery pipes 92A and 92B supply fuel to the port injector 91 and are provided on the inner sides of the left and the right banks 12A and 12B to be overlapped with the high pressure delivery pipes 82A and 82B as illustrated in FIG. 12. The delivery pipe coupling portion of the port injector 91 is coupled to the low pressure delivery pipes 92A and 92B. Thus, the fuel supplied to the low pressure delivery pipes 92A and 92B is supplied to the port injector 91 through the low pressure delivery pipe 92A. The control device accommodated in the body portion 91b is controlled with an electrical signal supplied from the electrical connector 93 attached to the connector attachment member 91d, in such a manner that a desired amount of fuel is supplied to the nozzle portion 91a at a desired injection timing. Thus, the fuel supplied to the nozzle portion 91a is injected through a nozzle port into two downstream side ports in such a manner as to spread to be in a conical form.

As illustrated in FIG. 12, the low pressure delivery pipes 92A and 92B provided to the left and the right banks 12A and 12B have inlets on a front end portion side. The low pressure delivery pipe 92A (hereinafter, referred to as "right side low pressure delivery pipe 92A") provided to the right side bank 12A has a front end portion 92A1 connected to a fuel pipe (branch pipe) 94b branched from the fuel pipe (main pipe) 94a. The low pressure delivery pipe 92B (hereinafter, referred to as "left side low pressure delivery pipe 92B") provided to the left side bank 12B has a front end portion 94B1 connected to the fuel pipe (main pipe) 94a. In this configuration, the fuel discharged from the low pressure fuel pump is supplied to the right side low pressure delivery pipe 92A and to the left side low pressure delivery pipe through the fuel pipes 94a and 94b. The fuel supplied to the right side low pressure delivery pipe 92A is supplied to the port injector 91 provided to the right side bank 12A. The fuel provided to the left side low pressure delivery pipe 92B is supplied to the port injector 91 provided to the left side bank 12B.

As described above, the engine main body 10 according to the present embodiment employs the offset crank structure. The right side bank 12A (the left side bank in FIG. 9) is disposed at a position higher than the left side bank 12B (the right side bank in FIG. 9). Due to the level difference, the same level difference of the intake ports 27 is provided between the right side bank 12A and the left side bank 12B. Thus, the same level difference is provided also between the port injectors 91 according to the present embodiment in the right side bank 12A and the left side bank 12B. The same level difference is provided between the connector attachment members 91d.

Similarly, the same level difference is provided between attachment levels of the low pressure delivery pipes 92A and 92B according to the present embodiment in the right side bank 12A and the left side bank 12B.

As described above, the V engine 1 according to an embodiment of the present invention has the valve seat 231 provided at the intake air inlet 23 opened to the combustion chamber 21, and has the arc portion 276 protruding downward in a center area of the intake port 27 on the upstream side of the valve seat 231. The injection axis T indicating the injection direction of the port injector 91 is orientated in a direction in which the fuel injected from the port injector 91 passes through the lower area of the arc portion 276. Thus, the direct injector 81 and the port injector 91 can be efficiently arranged, and the fuel injected from the port injector 91 is favorably mixed with air flowing in the intake port 27.

The direct injector 81 can be disposed in the lower area of the bifurcated downstream side ports 272, and thus can be efficiently arranged.

The fuel injected from the direct injector 81 spreads against the tumble flow generated in the cylinders 14A and 14B. Thus, the mixing of the fuel and the air is facilitated in the cylinders 14A and 14B.

The direct injectors 81 and the port injectors 91 are arranged to be orthogonal to the arrangement direction of the cylinders 14A and 14B. Thus, the high pressure delivery pipes 82A and 82B supplying fuel to the direct injectors 81 can be arranged in the arrangement direction of the cylinders 14A and 14B. The low pressure delivery pipes 92A and 92B supplying fuel to the port injectors 91 can be arranged in the arrangement direction of the cylinders 14A and 14B.

The intake manifolds 4A and 4B can be fixed to the cylinder heads 2A and 2B, in a state where the port injectors 91 are fixed to the intake manifolds 4A and 4B. The thickness of the port injector attachment seat can be reduced compared with a configuration where the nozzle portion 91a of the port injector 91 is positioned closer to the intake manifolds 4A and 4B than the joining surface 274.

The fuel (injection axis T) injected from the port injector 91 flows toward the umbrella center of the intake valve 25, and thus can be suppressed from attaching to the inner wall surface of the intake port 27.

The direct injectors 81 and the port injectors 91 can be arranged on the inner sides of the banks of the cylinder blocks 11 in a concentrated manner.

The plurality of direct injector 81 include the connector attachment members 81d, to which the electrical connectors 83 are connected, protruding outward from the body portions 81b in the radial direction and having different levels between the banks. Thus, the electrical connectors 83 can be attached to the direct injectors 81, with the interference of the electrical connectors 83 between the direct injector 81 in one bank 12A (12B) and the direct injectors 81 in the other bank 12B (12A) within a limited space between the banks.

The electrical connector 83 can be attached to the connector attachment member 81d from the outer side of the direct injector 81 in the radial direction. The electrical connector 83 can be detached from the connector attachment member 81d toward the outer side of the direct injector 81 in the radial direction.

The direct injector 81 disposed in the left side bank 12B is disposed at a lower position than the direct injector 81 disposed in the right side bank 12A. Thus, the electrical connectors 83 can be attached to the direct injectors 81, with the interference of the electrical connectors 83 between the direct injector 81 in one bank 12A on the right and the direct injectors 81 in the other bank on the left prevented within a limited space between the banks.

In the right side bank 12A, the connector attachment member 81d is oriented obliquely backward. In the left side bank 12B lower than the right side bank 12A, the connector attachment member 81d is oriented obliquely forward. Thus, the electrical connectors 83 can be attached to the connector attachment members 81d of the direct injectors 81 disposed in the right side bank 12A, and the electrical connectors 83 can be attached to the connector attachment members 81d of the direct injectors 81 disposed in the left side bank 12B, with the interference of the electrical connectors 83 between the direct injector 81 in one bank 12A on the right and the direct injectors 81 in the other bank on the left prevented.

The plurality of port injectors 91 include the connector attachment members 91d, to which the electrical connectors 93 are connected, protruding outward from the body portions 91b in the radial direction. Thus, the electrical connectors 93 can be attached to the port injectors, with the interference of the electrical connectors 93 between the port injector 91 in one bank 12A (12B) and the port injectors 91 in the other bank 12B (12A) prevented.

The electrical connector 93 can be attached to the connector attachment member 91d from the obliquely upper side of the port injector 91. The electrical connector 93 can be detached from the connector attachment member 91d toward the obliquely upper side of the port injector 91.

The low pressure delivery pipes 92A and 92B overlap with the high pressure delivery pipes 82A and 82B in plan view. Thus, the low pressure delivery pipes 92A and 92B do not largely protrude outward beyond the high pressure delivery pipes 82A and 82B. Thus, the high pressure delivery pipes 82A and 82B and the low pressure delivery pipes 92A and 92B are closely arranged, whereby efficient pipe operations of the high pressure delivery pipes 82A and 82B and the low pressure delivery pipes 92A and 92B can be achieved.

The high pressure delivery pipes 82A and 82B and the low pressure delivery pipes 92A and 92B are disposed on the inner sides of the banks of the cylinder blocks 11 in a concentrated manner. Thus, an efficient pipe operations of the high pressure delivery pipes 82A and 82B and the low pressure delivery pipes 92A and 92B can be achieved.

The high pressure delivery pipes 82A and 82B and the low pressure delivery pipes 92A and 92B in the left and the right banks 12A and 12B are alternately arranged while being shifted from each other in the upper and lower direction, as viewed in the direction of the crankshaft 15, and thus can be arranged between the V banks.

The higher bank (right side bank 12A) and the lower bank (left side bank 12B) are shifted in the direction of the crankshaft 15 in plan view. Thus, the high pressure delivery pipes 82A and 82B and the low pressure delivery pipes 92A and 92B in the left and the right banks 12A and 12B are alternately arranged while being shifted from each other in the front and rear direction, and thus can be more easily arranged between the V banks.

The inlet side of the high pressure delivery pipes 82A and 82B and the inlet side of the low pressure delivery pipes 92A and 92B are positioned on sides to each other in the arrangement direction of the cylinders 14A and 14B. Thus, the high pressure delivery pipes 82A and 82B and the low pressure delivery pipes 92A and 92B need not to be in a complex arrangement to be prevented from interfering each other on the fuel supply inlet side.

The intake manifolds 4A and 4B can be fixed to the cylinder heads 2A and 2B, in the state where the low pressure delivery pipes 92A and 92B are fixed to the intake manifolds 4A and 4B.

The direct injectors 81 and the port injectors 91 as well as their fuel supply pipes are arranged to be surrounded by the outlet housing 31, the supercharger 6, and the left and the right banks 12A and 12B. This is expected to be effective for safety at the time of collision, and a cooling effect with the enclosed internal space guiding the air flow due to vehicle traveling.

REFERENCE SIGNS LIST

V engine
10 Engine main body
11 Cylinder block
12A, 12B Bank
13 Crank casing
14A, 14B Cylinder (cylinder)
15 Crankshaft
16 Piston
162 Piston pin
17 Connecting rod
2A, 2B Cylinder head
21 Combustion chamber
22 Ignition plug
23 Intake air inlet
231 Valve seat (seat surface)
24 Exhaust air outlet
241 Valve seat
25 Intake valve
26 Exhaust valve
27 Intake port
271 Upstream side port
272 Downstream side port
273 Upstream side port opening
274 Joining surface
275 Flange (port injector attachment seat)
276 Arc portion
28 Discharge port
281 Upstream side port
29 Rocker cover
3 Air intake system
31 Outlet housing
32 Distribution passage
32A Ceiling surface
32A1 Ridge
33 Center opening
34A Opening (right opening)
34B Opening (left opening)
4A, 4B Intake manifold
5A, 5B Inter cooler
51 Casing
52 Inter cooler core
53 Collar
54A Inlet side (pipe)
54B Outlet side (pipe)
55 Collar
6 Supercharger
61 Housing
61A Housing main body
61A1 Upper surface front area opening
61B Inlet housing
61C Bearing housing
62 Input rotation shaft
63A Drive rotor (rotor)
63B Driven rotor (rotor)
64 Throttle body
64A Air inlet
66 Bypass valve
67 Pulley
68 Belt
69 Bypass housing
691 Bypass path
7 Fuel supply system
8 Cylinder injection device
81 Direct injector
81*a* Nozzle portion
81*b* Body portion
81*d* Connector attachment member
82A, 82B High pressure delivery pipe
82A1, 82B1 Rear end portion
83 Electrical connector
84*a*, 84*b* Fuel pipe
9 Port injection device
91 Port injector
91*a* Nozzle portion
91*b* Body portion
91*d* Connector attachment member
92A1, 94B1 Front end portion
92A, 92B Low pressure delivery pipe
93 Electrical connector
94*a*, 94*b* Fuel pipe

The invention claimed is:

1. An engine comprising:
a cylinder block including a plurality of cylinders;
a cylinder head attached on the cylinder block, the cylinder head defining, for each of the cylinders, an intake port extending from a combustion chamber obliquely in an upward direction relative to an axis of the cylinder;
a direct injector disposed at a position on an outer side of the intake port in a cylinder radial direction and directly injecting fuel into the combustion chamber;
a port injector disposed at a position on a same side as the direct injector relative to the intake port, and injecting fuel into the intake port, the port injector having a nozzle and extending into the intake port such that the nozzle is positioned at a lower inner surface side of the intake port, wherein
the intake port includes
a valve seat provided at an intake air inlet opened to the combustion chamber,
an upper inner surface of the intake port is provided with an arc portion protruding downward towards a center of the intake port, and
an injection direction of the port injector is orientated in a direction in which the fuel injected from the port injector passes through a lower area of the arc portion.

2. The engine according to claim 1, wherein an angle between the injection direction of the port injector and a lower surface of the cylinder head is larger than an angle between a straight line, which passes through an injection position of the port injector, from which the fuel is injected, and contacts a lower most surface of the arc portion, and the lower surface of the cylinder head.

3. The engine according to claim 1, wherein the intake port is bifurcated on a downstream side of the port injector.

4. The engine according to claim 2, wherein the intake port is bifurcated on a downstream side of the port injector.

5. The engine according to claim 1, wherein center axes of the direct injector and the port injector are disposed on a same plane passing through the axis of the cylinders.

6. The engine according to claim 2, wherein center axes of the direct injector and the port injector are disposed on a same plane passing through the axis of the cylinders.

7. The engine according to claim 3, wherein center axes of the direct injector and the port injector are disposed on a same plane passing through the axis of the cylinders.

8. The engine according to claim 5, wherein the center axes of the direct injector and the port injector are in parallel with each other or cross each other on a front side in a fuel injection direction.

9. The engine according to claim 6, wherein the center axes of the direct injector and the port injector are in parallel with each other or cross each other on a front side in a fuel injection direction.

10. The engine according to claim 7, wherein the center axes of the direct injector and the port injector are in parallel with each other or cross each other on a front side in a fuel injection direction.

11. The engine according to claim 5, wherein an angle between the center axis of the port injector and the lower surface of the cylinder head is equal to or larger than an angle between the center axis of the direct injector and the lower surface of the cylinder head.

12. The engine according to claim 5, wherein the plane passing through the axis of the cylinder is orthogonal to an arrangement direction of the cylinders.

13. The engine according to claim 1, further comprising:
an intake manifold connected to the cylinder head and having an intake air passage, which is formed to be branched and communicates with the intake port, wherein
the port injector is fixed to the intake manifold.

14. The engine according to claim 13, wherein
the intake port is opened to a flat surface extending in a horizontal direction on an upper surface of the cylinder head,
the intake manifold includes a joining surface which is joined to the flat surface of the cylinder head and through which the intake air passage passes, and
the port injector has a nozzle portion protruding toward the intake port beyond the joining surface.

15. The engine according to claim 1, wherein the port injector has an injection axis oriented to a center of a valve head of an intake valve closing the intake port.

16. The engine according to claim 1, wherein
the cylinder block has a V shape formed by the plurality of cylinder alternately arranged on left and right sides, and
the direct injector and the port injector are disposed on an inner side of a bank of the cylinder block.

17. The engine according to claim 16, wherein the port injector is disposed at a position where the intake port is most protruded toward the inner side of the bank of the cylinder block.

* * * * *

UNITED STATES PATENT AND TRADEMARK OFFICE
CERTIFICATE OF CORRECTION

PATENT NO. : 10,344,729 B2
APPLICATION NO. : 15/595042
DATED : July 9, 2019
INVENTOR(S) : Takehiro Nishidono et al.

Page 1 of 1

It is certified that error appears in the above-identified patent and that said Letters Patent is hereby corrected as shown below:

On the Title Page

Item (73), please correct the Assignees name from:
"MITSUBISHI KOGYO KABUSHIKI KAISHA, Tokyo (JP); MITSUBISHI JIDOSHA ENGINEERING KABUSHIKI KAISHA, Okazaki-Shi, Aichi (JP)"
To:
--MITSUBISHI JIDOSHA KOGYO KABUSHIKI KAISHA, Tokyo (JP); MITSUBISHI JIDOSHA ENGINEERING KABUSHIKI KAISHA, Okazaki-Shi, Aichi (JP)--.

Signed and Sealed this
Twelfth Day of November, 2019

Andrei Iancu
*Director of the United States Patent and Trademark Office*